United States Patent Office 3,647,791
Patented Mar. 7, 1972

3,647,791
2,3,4,4a,5,6-HEXAHYDRO - 1H - PYRAZINO [1,2-a] QUINOLINES AND PHARMACEUTICAL COMPOSITIONS CONTAINING SAME
Alberto Rossi, Oberwil, Basel-Land, and Ernst Sury, Basel, Switzerland, assignors to Ciba Corporation, New York, N.Y.
No Drawing. Filed Sept. 19, 1967, Ser. No. 668,957
Claims priority, application Switzerland, Oct. 5, 1966, 14,363/66; Feb. 2, 1967, 1,561/67, 1,562/67, 1,563/67; Aug. 11, 1967, 11,361/67, 11,362/67, 11,363/67, 11,364/67, 11,365/67
Int. Cl. C07d 51/72
U.S. Cl. 260—268 TR
31 Claims

ABSTRACT OF THE DISCLOSURE

Compounds of the formula

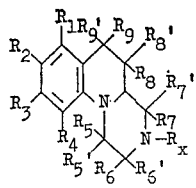

$R_1$ to $R_4$=H, alkyl, alkoxy, alkenyloxy, halogen, trifluoromethyl, methylenedioxy, hydroxy, acyloxy, nitro, amino or acylamino,
$R_5$, $R_5'$, $R_6$, $R_6'$, $R_7$, $R_7'$, $R_8$, $R_8'$, $R_9$, $R_9'$=hydrogen or alkyl,
$R_x$=hydrogen, an aliphatic hydrocarbon radical which may be substituted by an oxo group, by a free, etherified or acylated hydroxyl group or by a free or functionally converted carboxyl group, a cycloaliphatic hydrocarbon radical, a cycloaliphatic-aliphatic hydrocarbon radical which may be substituted in the aliphatic portion by an oxo group or by a free, etherified or acylated hydroxyl group, an araliphatic hydrocarbon radical which may be substituted in the aliphatic portion by an oxo group or by a free, etherified or acylated hydroxyl group and which may further be substituted in the aromatic portion, or a heterocyclic-aliphatic radical which may be substituted in the heterocyclic portion; and their salts and pharmaceutical compositions containing these compounds, for example: 3-benzyl-2,3,4, 4a,5,6-hexahydro-1H-pyrazino[1,2-a]quinoline.

Use: antihypertensives and sedatives.

---

The present invention relates to the manufacture of 2,3,4,4a,5,6-hexahydro-1H-pyrazino[1,2-a]quinoline comprising the nucleus of the formula

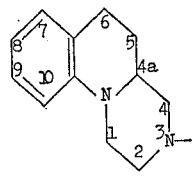

in which the substitutable carbon atoms of the heterocyclic rings are unsubstituted or alkylsubstituted, and which contain in 3-position a radical R which is an aliphatic hydrocarbon radical which may be substituted by an oxo group, by a free, etherified or acylated hydroxyl group or by a free or functionally converted carboxyl group, a cycloaliphatic hydrocarbon radical, a cycloaliphatic-aliphatic hydrocarbon radical which may be substituted in the aliphatic portion by an oxo group or by a free, etherified or acylated hydroxyl group, an araliphatic hydrocarbon radical which may be substituted in the aliphatic portion by an oxo group or by a free, etherified or acylated hydroxyl group and which may further be substituted in the aromatic portion, or a heterocyclic-aliphatic radical which may be substituted in the heterocyclic portion, said aliphatic radicals or aliphatic portions of radicals respectively being unsubstituted at the carbon atom adjacent to the nitrogen atom in 3-position of the pyrazinoquinoline nucleus, and their salts as well as the starting materials for their preparation, and pharmaceutical composition containing those compounds.

The new compounds possess valuable pharmacological properties. Inter alia, they act above all as antihypertensives, as is found in animal tests, for example, on conscious dogs, a sedative action and on cats an adrenolytic action. The new compounds are, therefore, useful pharmacologically and as antihypertonic and sedative agents. The new compounds are also valuable intermediates for the manufacture of other useful substances, especially those having a pharmacological action.

The new compounds are prepared by known methods.

DESCRIPTION OF THE PREFERRED EMBODIMENTS

Suitable aliphatic hydrocarbon residues R or aliphatic portions of the cycloaliphatic-aliphatic and araliphatic hydrocarbon residues and the heterocyclic-aliphatic residues are above all lower alkyl, alkenyl, or alkynyl residues, such as methyl, ethyl, propyl or isopropyl groups; linear or branched butyl, pentyl, hexyl or heptyl residues which may be bound in any desired position; propenyl residues, for example the allyl or propenyl residue, or butenyl groups, for example the methallyl, 3-butenyl or crotyl residue, or 2-propynyl residues, especially the propargyl residue, or the 2- or 3-butynyl residue.

Suitable aliphatic hydrocarbon radicals substituted by free or functionally converted carboxyl groups are above all lower alkyl, alkenyl or alkynyl radicals, for example those mentioned, which are substituted by free or functionally converted carboxyl groups.

Functionally converted carboxyl groups are above all esterified carboxyl groups, amidated carboxyl groups or cyano groups.

Suitable esterified carboxyl groups are, for example, carboxyl groups esterified with aliphatic or araliphatic alcohols, such as lower alkanols or phenyl-lower alkanols, for example, benzyl alcohols or phenylethanols; the aromatic portion may be substituted, for example, as shown below for the aromatic nuclei.

There may be mentioned as esterified carboxyl groups primarily carbalkoxy groups, such as lower carbalkoxy groups, for example carbomethoxy, carbethoxy or carbobutoxy groups.

Suitable amidated carboxyl groups are, for example free or substituted carbamoyl groups. The substituents of the carbamoyl groups may be, for example, lower alkyl radicals, for example those mentioned, or alkylene, oxaalkylene, aza-alkylene or thiaalkylene residues with up to 7 chain members, especially alkylene radicals with 4 to 7 chain members or oxa-alkylene, aza-alkylene or thiaalkylene radicals with 5 to 7 chain members such as butylene-(1,4), pentylene-(1,5), 3-oxa, 3-thia, or 3-azapentylene-(1,5), 3-alkyl-3-azapentylene-(1,5), for example 3-methyl-3-aza-pentylene-(1,5) or 3-hydroxyalkyl-3-azapentylene-(1,5) residues, for example 3-(β-hydroxyethyl)-3-azapentylene-(1,5) residues.

An aliphatic radical containing an oxo group or a free, etherified or acylated hydroxyl group, or an aliphatic portion of an araliphatic or cycloaliphatic-aliphatic radical containing an oxo group or a free, etherified or acylated hydroxyl group is primarily a lower alkyl radical with at least two carbon atoms containing an oxo group or a free, etherified or acylated hydroxyl group, such as a corresponding ethyl, propyl, or isopropyl radical or a straight or branched butyl, pentyl, hexyl or heptyl radical linked in any desired position.

In this context, oxo groups are intended to be aldehydic oxo groups or primarily ketonic oxo groups.

Acylated hydroxyl groups are primarily hydroxyl groups esterified with aliphatic, araliphatic or aromatic carboxylic acids, for example with lower alkanoic acids, phenyl-lower alkanoic acids or benzoic acids, as for example acetoxy, phenylacetoxy or benzoyloxy groups, in which the aromatic-radicals may be substituted, for example, as shown below for the aromatic nuclei.

Etherified hydroxyl groups are preferably hydroxyl groups etherified with lower aliphatic or araliphatic hydrocarbon radicals, for example hydroxyl groups carrying lower alkyl radicals or phenyl-lower alkyl radicals such as benzyl radicals or phenylethyl radicals, for example methoxy, ethoxy, propoxy or benzyloxy radicals, in which the aromatic radicals may be substituted, for example, as shown below for the aromatic nuclei.

Cycloaliphatic hydrocarbon residues R are above all lower cycloalkyl or cycloalkenyl residues, for example those with 3- to 6-membered rings, especially those with 5- or 6-membered rings, such as cyclopropyl, cyclobutyl, cyclopentyl, cyclohexyl or cycloheptyl groups, or cyclopentenyl or cyclohexenyl residues.

The cycloaliphatic hydrocarbon residues and the cycloaliphatic portions of the cycloaliphatic-aliphatic hydrocarbon residues may be unsubstituted or mono- or polysubstituted. Substituents are, above all, lower alkyl radicals, for example those mentioned above, or possibly lower alkylated lower endoalkylene residues, for example 1,2-ethylene, 1,2-propylene or 1,3-propylene radicals.

The aromatic portion of the optionally substituted araliphatic hydrocarbon residue R is primarily an aryl residue, for example a phenyl residue. This aromatic portion may be unsubstituted or mono- or poly-substituted. As suitable substituents there may be mentioned: Lower alkyl radicals, for example those mentioned above, halogen atoms such as fluorine, chlorine, bromine or iodine atoms or the pseudohalogen trifluoromethyl; lower alkoxy groups, for example methoxy, ethoxy, propoxy, isopropoxy or methylenedioxy groups; or amino groups, acylamino groups, nitro groups or free or acylated hydroxyl groups. Suitable acylated hydroxyl groups or acylamino groups are, for example, those in which the acyl residue is derived from a lower fatty acid, for example a lower alkanoic acid such as acetic, propionic, pivalic acid, a phenyl-lower alkanoic acid, for example a phenylacetic acid, such as the phenylacetic acid itself or a phenylacetic acid whose aromatic residue is substituted as indicated above; or an aromatic carboxylic acid such as a benzoic acid, for example benzoic acid itself or a benzoic acid whose aromatic residue is substituted as indicated above; or an etherified hydroxyformic acid, such as benzyloxyformic acid or a lower alkoxyformic acid, such as tertiary butyloxyformic or from ethoxyformic acid.

As heterocyclic portions of the optionally substituted heterocyclic-aliphatic residue R there are particularly suitable heterocyclic residues of aromatic character, for example pyridyl residues, such as 2-, 3- or 4-pyridyl residues, pyrazolyl such as 3- or 4-pyrazolyl residues, pyrrolyl such as 2-pyrrolyl residues, imidazolyl such as 2-imidazolyl residues, furyl such as 2-furyl, thienyl such as 2-thienyl, thiazoyl such as 2-thiazolyl residues or oxazolyl such as 2-oxazolyl residues.

The aforementioned heterocyclic portions may be unsubstituted or contain one or several substituents. Substituents may be, for example those mentioned for the aromatic portions of the araliphatic residues, particularly the lower alkyl residues, the lower alkoxy groups and the halogen atoms, but also phenyl residues which may be substituted, for example as indicated above.

Thus, the radical R may be, for example, a radical of the formula $R_a$-, $R_b$-alk-, $R_c$-alk-, Het-alk-, $R_c$-alk'-, H-alk'-, $R_c$-alk''- or H-alk''-, in which $R_a$ stands for a lower alkenyl, lower alkynyl, cyclo-lower alkyl, lower alkyl-cyclo-lower alkyl, endo-lower alkylene-cyclo-lower alkyl, cyclo-lower alkenyl, lower alkyl-cyclo-lower alkenyl or endo-lower alkylene-cyclo-lower alkenyl radical, $R_b$ stands for a carboxyl, cyano, carbamoyl, lower-alkyl-carbamoyl, di-lower alkyl-carbamoyl, lower alkenylene-carbamoyl, lower oxa-alkylene-carbamoyl, lower aza-alkylene-carbamoyl, lower thia-alkylene-carbamoyl, carbo-lower alkoxy group or a phenyl-lower alkoxy-carbonyl radical which may be substituted by at least one member, e.g. one to five members, selected from the group consisting of lower alkyl, lower alkoxy, lower alkenyloxy, halogen, trifluoromethyl, hydroxyl, nitro, amino, lower alkanoyloxy and lower alkanoylamino, $R_c$ for a cyclo-lower alkyl, lower alkyl-cyclo-lower alkyl, endo-lower alkylenecyclo-lower alkyl, cyclo-lower alkenyl, lower alkyl-cyclo-lower alkenyl or endo-lower alkylene-cyclo-lower alkenyl radical or a phenyl radical which may be substituted by at least one member, e.g. one to five members, selected from the group consisting of lower alkyl, lower alkoxy, lower alkenyloxy, methylenedioxy, halogen, trifluoromethyl, hydroxyl, lower alkanoyloxy, benzoyloxy, phenyl-lower alkanoyloxy, lower alkoxycarbonyloxy, nitro, amino, lower alkanoylamino, benzoylamino, phenyl-lower alkanoylamino and lower alkoxycarbonylamino, Het stands for a pyridyl, pyrazolyl, pyrrolyl, imidazolyl, furyl, thienyl, thiazolyl or oxazolyl radical which may be substituted by at least one member selected from the group consisting of lower alkyl, amino, lower alkoxy, halogen, phenyl, lower alkylphenyl, lower alkoxyphenyl, halogenophenyl, lower alkenyloxyphenyl and trifluoromethylphenyl, alk stands for a lower alkylene, lower alkenylene or lower alkynylene radical, alk' stands for a lower alkylene radical having at least two carbon atoms and being unsubstituted at the carbon atom adjacent to the nitrogen atom in 3-position of the pyrazinoquinoline nucleus and carrying at another carbon atom the oxo group, alk'' stands for a lower alkylene radical having at least two carbon atoms and being unsubstituted at the carbon atom adjacent to the nitrogen atom in 3-position of the pyrazinoquinoline nucleus and carrying at another carbon atom a hydroxy, lower alkoxy or lower alkanoyloxy radical or a phenyl-lower alkoxy, benzoyloxy or phenyl-lower alkanoyloxy radical which may be substituted by at least one member, e.g. by one to five members, selected from the group consisting of lower alkyl, lower alkoxy, lower alkenyloxy, methylenedioxy, halogen, trifluoromethyl, hydroxyl, lower alkanoyloxy, benzoyloxy, phenyl-lower alkanoyloxy, lower alkoxycarbonyloxy, nitro, amino, lower alkanoylamino, benzoylamino, phenyl-lower alkanoylamino and lower alkoxycarbonylamino. R may also stand for a lower alkyl radical.

The new compounds may additionally contain further substituents. Thus, for example, the benzene nucleus of the pyrazinoquinoline nucleus may be unsubstituted or contain one or several substituents, for example the groups mentioned above for the aromatic portions of the araliphatic residues.

The heterocyclic systems of the pyrazinoquinoline nucleus may be unsubstituted or alkylated. Suitable alkyl groups are, for example, those mentioned above.

Special mention deserve the compounds of the formula

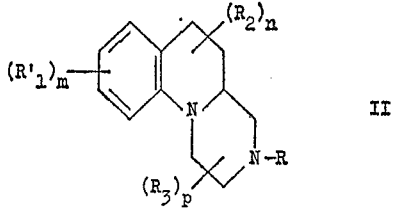

where $R_1'$ represents a lower alkyl or alkoxy radical, the trifluoromethyl group, the hydroxyl group, a halogen atom or especially a hydrogen atom; $R_2$ and $R_3$ are lower alkyl radicals or especially hydrogen; m, n and p are integers smaller than 3 and R has the above meaning.

Likewise, there should be specially mentioned compounds of the formula

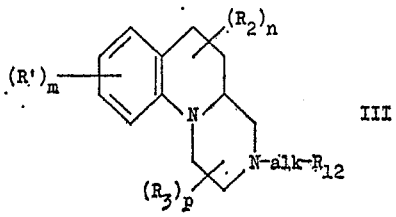

where $R_1'$, $R_2$, $R_3$, m, n and p have the above meanings; alk represents a lower alkylene radical, such as the ethylene-(1,2) residue or above all the methylene residue, and $R_{12}$ represents a phenyl, pyridyl, thienyl or furyl radical which may be substituted, for example as indicated above, and especially compounds of the formula

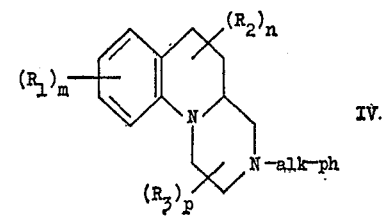

where $R_1$ represents a lower alkyl, lower alkoxy or trifluoromethyl residue or a halogen atom or more particularly a hydrogen atom, $R_2$, $R_3$, m, n and p have the above meanings; alk is a lower alkylene radical, and pH a possibly substituted phenyl residue, and above all compounds of the formula

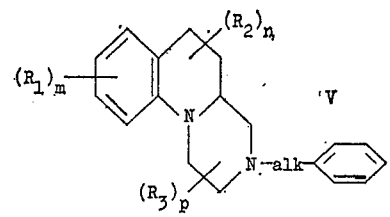

where $R_1$, $R_2$, $R_3$, m, n and p have the above meanings and alk represents a lower alkylene radical, and especially compounds of the formula

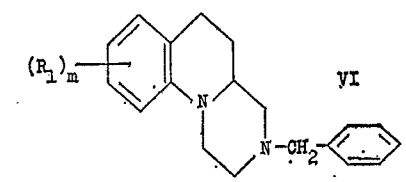

where $R_1$ and m have the above meanings. Special mention, because of its potency, in this group deserves 3-benzyl - 2,3,4,4a,5,6-hexahydro-1H-pyrazino[1,2-a]quinoline, which for example in the form of its hydrochloride, on oral administration of 10 mg. per kg. per day produces in renal hypertonic rats a distinct reduction of the blood pressure.

Furthermore, there are valuable compounds of the formula

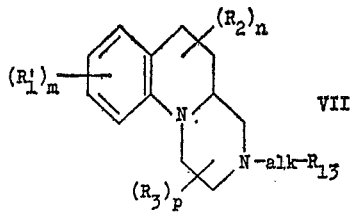

where $R_1'$, $R_2$, $R_3$, m, n and p have the above meanings; alk represents a lower alkylene radical and $R_{13}$ a possibly substituted thienyl, furyl or pyridyl residue, and above all compounds of the formula

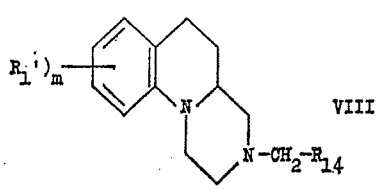

where $R_1'$ and m have the above meanings and $R_{14}$ represents the 2-furyl, 2-thienyl, 2-pyridyl, 3-pyridyl or 4-pyridyl radical. Particularly active in this group are 3-furfuryl - 2,3,4,4a,5a6-hexahydro-1H-pyrazino[1,2-a]-quinoline and 3-(2-thenyl)-2,3,4,4a5a6-hexahydro-1H-pyrazino[1,2-a]quinoline.

Further valuable compounds are those of the formula

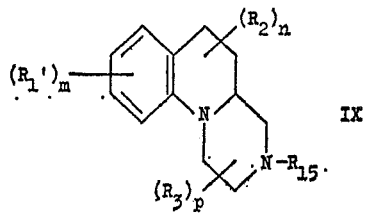

in which $R_1'$, $R_2$, $R_3$, m, n and p have the meanings given and $R_{15}$ represents a lower alkyl radical, and particularly those compounds of the above formula in which $R_1'$ represents a lower alkyl radical, a lower alkoxy group, a halogen atom or the trifluoromethyl group, m stands for 1 and $R_2$ and $R_3$ represent hydrogen atoms and especially 3 - butyl - 2,3,4,4a,5,6 - hexahydro - 1H - pyrazino[1,2-a] quinoline and 3 - ethyl - 2,3,4,4a,5,6 - hexahydro - 1H-pyrazino[1,2-a]quinoline.

Of special value are compounds of the formula

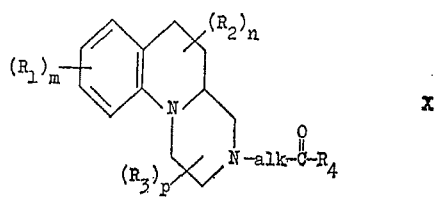

where $R_1$ represents a lower alkyl or alkoxy or the trifluoromethyl residue, a halogen atom or especially a hydrogen atom; $R_2$, $R_3$, m, n and p have the above meaning; $R_4$ stands for a lower alkyl radical or an aryl radical, the aryl radical being above all a possibly substituted phenyl radical, and alk represents a lower alkylene radical, above all the ethylene-(1,2) residue.

Special mention deserve compounds of the formula

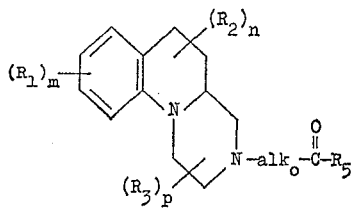 XI where $R_1$, $R_2$ and $R_3$ have the above meanings and $alk_0$ is a lower alkylene radical which separates the carbonyl carbon atom from the nitrogen atom by two carbon atoms, being above all the ethylene-1,2 residue; $R_5$ represents a lower alkyl, above all methyl, or a possibly substituted phenyl radical, and $m$, $n$ and $p$ have the same meanings as in Formula II.

Particularly active are compounds of the formula

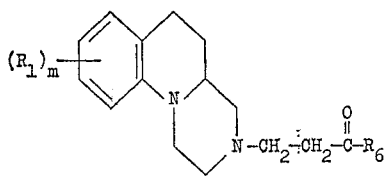 XII where $R_1$ and $m$ have the same meanings as in Formula IV, and $R_6$ represents a methyl group or a possibly substituted phenyl radical.

Special mention deserves the 3 - (3 - oxobutyl) - 2,3,4, 4a,5,6 - hexahydro - 1H - pyrazino[1,2-a]quinoline, for example in the form of its hydrochloride, on oral administration of 10 mg. per kg. per day produces in renal hypertonic rats a distinct reduction of the blood pressure.

Of special value are compounds of the formula

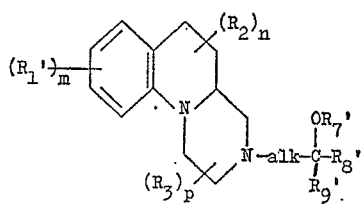 XIII where $R_1'$, $R_2$, $R_3$, $m$, $n$ and $p$ have the above meanings; $R_7'$ represents a hydrogen atom, a lower alkyl radical, a lower alkanoyl radical, a possibly substituted (for example as indicated above) phenyl-lower alkyl, phenyl-lower alkanoyl or benzoyl group; $R_8'$ represents a hydrogen atom or preferably a lower alkyl radical or a phenyl radical which may be substituted, for example as indicated above; $R_9'$ represents a lower alkyl radical or especially a hydrogen atom, and alk represents a lower alkylene radical and stands above all for the methylene or preferably the 1,2-ethylene residue, especially compounds of the formula

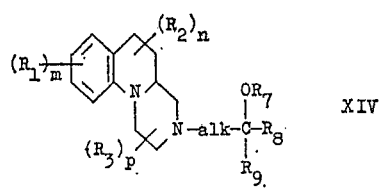 XIV wherein $R_1$ stands for a lower alkyl radical, a lower alkoxy radical, a halogen atom or the trifluoromethyl group, $R_2$, $R_3$, alk, $m$, $n$ and $p$ have the indicated meanings; $R_8$ stands for a lower alkyl radical or a phenyl radical which may be substituted, for example as indicated, $R_8$ is a lower alkyl or lower alkanoyl radical or above all hydrogen, and $R_9$ stands for a lower alkyl radical or preferably hydrogen, above all compound of the formula

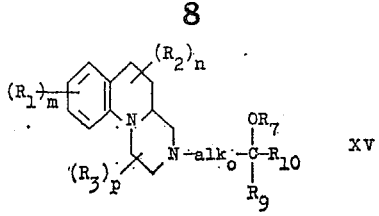 XV where $R_1$, $R_2$, $R_3$, $m$, $n$, and $p$ have the indicated meanings, "$alk_0$" represents a lower alkylene radical separating the oxygenated carbon atom from the nitrogen atom by two carbon atoms, primarily the 1,2-ethylene radical, $R_{10}$ stands for a lower alkyl radical, primarily the methyl radical, or a phenyl radical which may be substituted, and $R_7$ and $R_9$ have the meanings shown in Formula XIV, and especially compounds of the formula

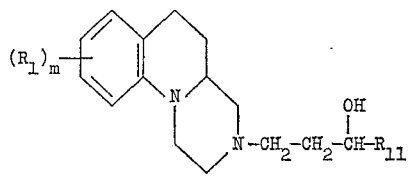 XVI where $R_1$ and $m$ have the same meanings as in Formula XIV and $R_{11}$ represents a methyl group or a possibly substituted phenyl group. Particularly active in this group is 3 - (3 - hydroxybutyl) - 2,3,4,4a,5,6 - hexahydro-1H-pyrazino[1,2-a]quinoline, which, for example, in the form of its hydrochloride on oral administration of 10 mg. per kg. per day produces in renal hypertonic rats a distinct reduction of blood pressure.

Also important are compounds of the formula

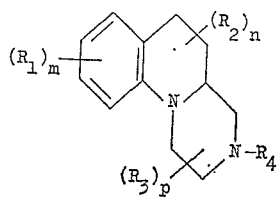 XVII where $R_1$ represents a lower alkyl or alkoxy radical, the trifluoromethyl radical or a halogen atom or especially a hydrogen atom; $R_2$, $R_3$, $m$, $n$ and $p$ have the above meanings, and $R_4$ stands for a lower alkyl radical substituted by a carboxyl, lower carbalkoxy, carbamoyl or cyano group.

Further valuable compounds are those of the formula

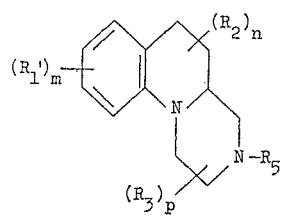 XVIII where $R_5$ represents a lower alkyl radical which is substituted by a carboxyl group or by a lower carbalkoxy group, for example a carbomethoxy, carbopropoxy or carbethoxy group and $R_1'$, $R_2$, $R_3$, $m$, $n$ and $p$ have the above meanings, and above all those compounds of the above formula in which $R_2$ and $R_3$ are hydrogen atoms. Particularly valuable in this group is 3-(2-carbethoxyethyl) - 2,3,4,4a,5,6 - hexahydro - 1H-pyrazino[1,3-a]quinoline, which, for example, in the form of its hydrochloride, an oral administration of 30 mg. per kg. per day produces in renal hypertonic rats a distinct reduction of the blood pressure.

The new compounds are manufactured by known methods.

For example, in a 2,3,4,4a,5,6-hexahydro-1H-pyrazino-[1,2-a]quinoline, in which the substitutable carbon atoms of the heterocycles are unsubstituted or alkylated and which are unsubstituted in position 3, the residue R is introduced in position 3 (where R has the above meaning).

The residue R can be introduced, for example, with the aid of reactive esters of alcohols of the formula R—OH. Reactive esters are in the first place those of strong inorganic or organic acids, especially of hydrohalic acids, for example hydrochloric, hydrobromic or hydriodic acid; of sulfonic acids, especially arylsulfonic acids, for example benzenesulfonic or toluenesulfonic acids; of alkylsulfonic acid or of sulfuric acid. The reaction is carried out in the usual manner, advantageously in the presence of a basic condensing agent.

The residue R can also be introduced by reaction with a reactive, unsaturated compound containing an aliphatic multiple bond and a group that activates this bond.

A group activating a multiple bond is, for example, an electron-attracting residue, for example a free or functionally converted carboxyl group, for example an esterified carboxyl group, such as a carbalkoxy group, a nitrile group or a carbamoyl group, an oxo group or an aromatic or heterocyclic radical.

Suitable unsaturated, reactive compounds are for exemple $a,\beta$-unsaturated carbonyl compounds, for example $\alpha,\beta$-unsaturated acids, $\alpha,\beta$-unsaturated amides, for example acrylamide, $\alpha,\beta$-unsaturated esters, for example acryl esters, $\alpha,\beta$-unsaturated nitriles, for example acrylonitrile, $\alpha,\beta$-unsaturated ketones, for example methylvinylketone, or aromatic or heterocyclic compounds which are substituted by optionally substituted, for example alkylated, vinyl radicals.

An aliphatic hydrocarbons radical substituted by a free hydroxyl group or another radical R containing in its aliphatic portion a free hydroxyl group can also be introduced by reaction with a suitable epoxide. The reaction mentioned is performed in the usual manner.

A compound having an unsubstituted aliphatic radical R or another radical R which is unsubstituted in its aliphatic portion can also be prepared by reducing the amidic oxo groups(s) in a 3-R-2,3,4,4a,5,6 - hexahydro-1H-pyrazino[1,2-a]quinoline, in which at least one of the carbon atoms which, owing to the vicinity to a nitrogen atom is capable of forming an amidic oxo group, carries an amidic oxo group, and in which unoxygenated carbon atoms of the hetero rings are unsubstituted or alkylated, and R has the above meaning. Advantageously, the amidic oxo group(s) is/are in the radical R at the carbon atom adjacent to the nitrogen atom in 3-position of the pyrazinoquinoline nucleus and/or in 1-position. The reduction may be carried out, for example, by reaction with an agent that is suitable for amide reduction and gives off hydride ions, for example a suitable di-light metal hydride, especially an alkali metal-aluminum hydride, such as lithium- or sodium-aluminum hydride. If nceessary, the reducing agent may be used in combination with an activator, for example aluminum chloride. The reduction may also be carried out, for example, electrolytically, advantageously on cathodes having a high overvoltage, such as mercury, lead amalgam or lead cathodes.

In resulting compounds substituents may be introduced, modified or eliminated to suit the products of this invention. Such operations are, for example, the following:

(a) In a resulting compound, whose residue R contains a functionally modified carboxyl group, for example in nitriles, esters or amides, this group can be converted into the free carboxyl group.

The conversion is carried out in the usual manner, for example, hydrolytically, preferably in the presence of an acid or basic catalyst and if desired or required in the presence of an oxidant.

(b) In a resulting compound, whose residue R contains a free carboxyl group, this group may be converted into a functional derivative thereof, for example an ester group or amide group.

The conversions referred to are carried out in the usual manner. Thus, for example, a resulting free carboxylic acid may be converted into the ester, for example by reaction with an alcohol in the presence of an esterifying catalyst, such as an acid, for example a mineral acid, or by reaction with a diazo compound, for example a diazoalkane. The free carboxyl groups can also be converted into esterified or amidated carboxyl groups via the halides. Thus, for example, free acids may be converted into acid halides, for example by reaction with halides of phosphorus or sulfur, such as thionylchloride or phosphorus pentachloride or tribromide. The acid halides can be converted into esters or amides in the usual manner, for example by reaction with alcohols or with ammonia or amines.

(c) In a resulting compound functionally modified carboxyl groups may be converted into other groups of this kind. Thus, a cyano group can be converted into an ester group or amide group. The conversion is carried out in known manner, for example by hydrolysis or alcoholysis in the presence of an acidic or basic catalyst such as a Lewis acid, for example boron trifluoride or aluminum chloride.

Furthermore, esterified carboxyl groups can be converted into carbamoyl groups. This conversion is performed in conventional manner, for example, by reaction with ammonia or an amine.

(d) In a resulting compound, whose residue R contains an oxo group, the oxo group may be converted into a free hydroxyl group. This conversion may be carried out in the usual manner, for example by reducing the oxo group to the hydroxy group. This reduction is carried out in the usual manner, for example by metallic reduction, such as treatment with sodium in alcohol, or with a complex metal hydride such as sodium borohydride, or with catalytically activated hydrogen, for example hydrogen in the presence of a platinum oxide, palladium carbon, Raney nickel or copper chromite. The reaction is preferably conducted in the presence of a diluent and/or solvent, at room temperature or with cooling or heating, under atmospheric or superatmospheric pressure.

The conversion of an oxo group into a hydroxyl group can alternatively be performed by reaction with an organo-metal compound of the formula $R_0$—Mg—Hal or $R_0Li$ in which $R_0$ represents a corresponding, optionally substituted hydrocarbon radical, for example an aliphatic, cycloaliphatic, cycloaliphatic-aliphatic, aromatic or araliphatic hydrocarbon radical, said aromatic or araliphatic hydrocarbon radical being optionally substituted in its aromatic portion, Hal stands for a halogen atom, such as chlorine, bromine or iodine. The reactions are performed in the usual manner, advantageously in an inert solvent, such as ether, for example diethyl ether or tetrahydrofuran.

(e) In a resulting compound, which contains a free hydroxyl group, this group may be etherified or acylated. The acylation is carried out in the usual manner, for example with the use of an anhydride, or halide, especially the chloride, of a carboxylic acid, for example of an aliphatic or aromatic carboxylic acid. The etherification is carried out in the usual manner, for example by reaction with a reactive ester of an alcohol, preferably in the presence of a strong base.

Reactive esters are for example those mentioned above.

(f) In a resulting compound containing an acylated hydroxyl group the latter can be split to form the free hydroxyl group. Acylated hydroxyl groups are, for example, those mentioned above. The splitting is performed, for example, hydrolytically in the presence of an acidic or basic catalyst as suitable, for example with sodium hydroxide solution.

(g) In a resulting compound containing an alkoxy group on an aromatic ring this group can be converted into a free hydroxyl group in the usual manner. This conversion is carried out, for example, by hydrolysis, above all with a strong acid, for example concentrated hydriodic or hydrobromic acid, and, if required or desired, in the presence of a light metal halide, such as aluminum bromide or boron bromide.

(h) In resulting compounds that contain free amino groups, these groups may be acylated. The acylation is performed in the usual manner, for example by reaction with an anhydride or halide, for example the chloride, or a carboxylic acid.

(i) In resulting acylamino compounds the acyl residue can be eliminated in the usual manner, for example by hydrolysis, preferably in the presence of an acidic or basic catalyst.

Depending on the starting materials and reaction conditions used the final products are obtained in the free form or in the form of their salts which are likewise included in the present invention. The salts of the final products can be converted in known manner, for example with alkalies or ion exchange resins, into the free bases. When the free bases are reacted with inorganic or organic acids, especially those which are capable of forming therapeutically acceptable salts, they yield salts. As such acids there may be mentioned, for example, hydrohalic, sulfuric and phosphoric acids, nitric and perchloric acid; aliphatic, alicyclic, aromatic and heterocyclic carboxylic or sulfonic acids, such as formic, acetic, propionic, succinic glycollic, lactic, malic, tartaric, citric, maleic, hydroxymaleic and pyruvic acid; phenylacetic; benzoic, para-aminobenzoic, anthranilic, para-hydroxybenzoic, salicylic and para-aminosalicylic acid, embonic, methanesulfonic, ethanesulfonic, hydroxyethanesulfonic, ethylenesulfonic acid; halobenzenesulfonic, toluenesulfinic, naphthalenesulfonic and sulfanilic acid; methionine, tryptophan, lysine and arginine.

These or other salts of the new compounds, for example their picrates, may also be used for purifying the resulting free bases, by converting them into their salts, isolating the salts and once more liberating the bases from the salts. In view of the close relationship between the new compounds in the free form and in the form of their salts what has been said above and below regarding the free bases concerns also the corresponding salts wherever this is possible and useful.

Compounds containing free carboxyl groups, can also form salts with bases, above all therapeutically acceptable salts with bases, for example salts with organic amines, or metal salts or inner salts. Especially suitable metal salts are alkali metal salts such as sodium and potassium salts. The conversion of the free acids into the salts is carried out in the usual manner, for example by reaction with suitable basic agents. From the salts the free acids can be liberated in the usual manner, for example by reaction with acidic agents.

The new compounds may be obtained in the form of optical antipodes, racemates or, if they contain more than one asymmetrical carbon atoms, in the form of racemate mixtures.

Racemate mixtures can be resolved—by virtue of the physico-chemical differences of the constituents—in known manner into the two stereoisomeric (diastereomeric) pure racemates, for example by chromatography and/or fractional crystallization.

Pure racemates may likewise be converted in known manner into theoptical antipodes, for example by recrystallization from optically active solvent, with the aid of microorganisms or by reaction with an optically active acid that form salts with racemic compound and separation of the resulting salts into the diastereomers, for example on the strength of their different solubilities. From the diastereomers the antipodes can then be obtained by the action of suitable reagents. Especially frequently used optically active acids are, for example, the D- and L-forms of tartaric, di-ortho-toluyl-tartaric, malic, mandelic, camphorsulfonic or quinic acid. It is advantageous to isolate the more reactive of the antipodes.

The new compounds may also take the orm of a mixture of the cis- and trans-isomers, for example cis- and trans-olefines. The separation of these isomer mixtures is carried out in known manner, for example on the strength of the physico-chemical differences between the constituents, for example by chromatography and/or fractional crystallization.

The invention includes also any variant of the present process in which an intermediate product obtainable at any stage thereof is used as starting material and the remaining process steps are carried out, or the process is discontinued at any stage thereof, or in which a starting material is formed under the reaction conditions, or the reactants may be in the form of their salts.

For the performance of the reactions of this invention it is advantageous to use starting materials that give rise to the groups of final products specifically mentioned above and to the final products mentioned as specially valuable.

The starting materials are known or, insofar as they are new, they can be prepared by known methods.

The 3 - unsubstituted 2,3,4,4a,5,6 - hexahydro - 1H-pyrazino[1,2-a]quinolines used as starting material may be prepared by known methods. For example they are obtained, when a 3-Y-2,3,4,4a,5,6 - hexahydro - 1H - pyrazino[1,2-a]quinoline in which the substitutable carbon atoms of the heterocyclic rings are unsubstituted or alkylated and wherein Y represents a residue eliminable by hydrogenolysis, Y is split off by hydrogenolysis.

Y is above all an α-aralkyl radical, such as a benzyl group, or an α-aralkoxy-carbonyl residue such as a carbobenzoxy residue which can be eliminated by reduction with catalytically activated hydrogen, such as hydrogen in the presence of a hydrogenating catalyst such as a palladium or platinum catalyst.

In the resulting compounds it is possible to introduce, modify or eliminate substituents in the usual manner within the definition of the final process products.

Thus, in a resulting compound the above mentioned conversions (e), (f), (g), (h) and (i) may be carried out, as the case may be.

The 3 - unsubstituted 2,3,4,4a,5,6-hexahydro-1H-pyrazino[1,2-a]quinolines that contain at least one substituent on the aromatic ring and in which the substitutable carbon atoms of the heterocycles are unsubstituted or alkylated, are new and have valuable pharmacological properties and form therefore also an embodiment of the present invention. They have, in addition to an inhibiting effect upon the central nervous system, especially an anti-hypertensive effect as can be shown in animal tests, for example on renal hypertonic rats. The new compounds are therefore useful as anti-hypertensives and sedatives. The new compounds are also valuable intermediates for the manufacture of other useful substances, especially compounds having a pharmacological action.

Special mention deserve the compounds of the formula

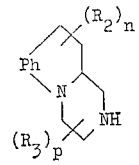

where pH represents an ortho-phenylene residue which contains one, two or more lower alkyl radicals, lower alkoxy groups, lower alkenyloxy groups, halogen atoms, hydroxyl group and/or trifluoromethyl groups; $R_2$ and $R_3$ each represents a lower alkyl group or especially a hydrogen atom; and $n$ and $p$ each is 1 or 2, and especially the compounds of the formula

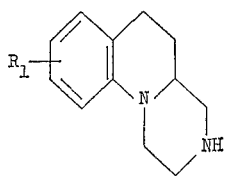

where $R_1$ represents a lower alkyl group, a lower alkoxy group, a trifluoromethyl group, a halogen atom or a hydroxyl group and above all the 8-methoxy-2,3,4,4a,5,6-hexahydro-1H-pyrazino[1,2-a]quinoline, which for instance in the form of its hydrochloride has a distinct hypotensive effect on renal hypertonic rats when given orally in a dose from 1 to 10 mg. per kg. of bodyweight.

As salts of the 3-unsubstituted compounds are suitable, for example, those mentioned above. They may likewise be used for purification. Racemate mixtures and/or racemates may be separated as described above.

Another embodiment of the present invention are pharmaceutical compositions containing the above-mentioned new and active compounds and pharmaceutical compositions containing the unsubstituted 2,3,4,4a,5,6-hexahydro-1H-pyrazino[1,2-a]quinoline.

The unsubstituted 2,3,4,4a,5,6-hexahydro-1H-pyrazino[1,2-a]quinoline has also valuable pharmaceutical properties. Thus, in addition to a central inhibiting action, it has, as is found in animal test, for example on rats, an antihypertensive action. Thus, for example, the unsubstituted 2,3,4,4a,5,6-hexahydro-1H-pyrazino[1,2-a]quinoline produces, for example in the form of its hydrochloride, on oral administration of 10 mg. per kg. per day in renal hypertonic rats a distinct reduction of the blood pressure. Accordingly the preparations are useful as antihypertensive agents.

The active compounds may be used, for example, in the form of pharmaceutical preparations containing them in the free form or in the form of their therapeutically acceptable salts in conjunction or admixture with an organic or inorganic, solid or liquid pharmaceutical excipients suitable for enteral or parenteral administration. Suitable excipients are substances that do not react with the new compounds, for example water, gelatin, lactose, starches, stearyl alcohol, magnesium stearate, talcum, vegetable oils, benzyl alcohols, gums, propyleneglycols, white petroleum jelly or other known medicinal excipients. The pharmaceutical preparations may be, for example tablets, dragées, capsules, or suppositories, or in liquid form solutions (for example elixirs or syrups), suspensions or emulsions. They may be sterilized and/or may contain assistants such as preserving, stabilizing, wetting or emulsifying agents, solution promoters, salts for regulating the pressure or buffers. They may also contain other therapeutically valuable substances. The pharmaceutical preparations are formulated by known methods.

The pharmaceutical preparations for enteral, for example oral or rectal, administration advantageously contain about 1–60% of active substance or about 10 to 200 mg., especially 20 to 60 mg. of the active substance per dosage unit.

The quantity of the carrier material may vary within wide limits and depends chiefly on the route of administration.

The daily dose depends on the form of administration and on the individual needs of the patient. It can easily be determined by the physician.

The invention also relates to a process for reducing blood pressure, wherein a warm-blooded being is given a 3-R-2,3,4,4a,5,6-hexahydro-1H-pyrazino[1,2-a]quinoline (in which R has the meaning given above or stands for hydrogen and in which the substitutable carbon atoms of the heterocyclic portion of the pyrazinoquinoline ring system are unsubstituted or alkylated), for example in the form of a pharmaceutical preparation.

The active compounds may also be used in the form of feeding stuffs, using, for example, the conventional extenders or feeding stuffs respectively.

The following examples illustrate the invention.

Example 1

A suspension of 10 g. of lithium-aluminium hydride in 250 ml. of absolute dioxane is stirred and heated to 80° C., and a solution of 10 g. of 1-oxo-3-benzoyl-2,3,4,4a,5,6-hexahydro-1H-pyrazino[1,2-a]quinoline in 50 ml. of absolute dioxane is dropped in. The batch is stirred on for 6 hours at 100° C., cooled with an ice bath and 20 ml. of water are dropped in. After stirring for 2 hours the mixture is filtered, rinsed with dioxane, the filtrate evaporated under vacuum, the oily residue taken up in ethylenechloride and extracted with 2 N-hydrochloric acid. The aqueous phase is rendered alkaline with sodium hydroxide solution and extracted with ethylenechloride. The ethylenechloride layer is dried over magnesium sulphate and evaporated and the oily residue is distilled under a high vacuum to yield 3 - benzyl - 2,3,4,4a,5,6-hexahydro-1H pyrazino[1,2-a]quinoline of the formula

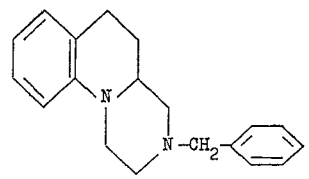

in the form of a faintly yellowish oil boiling at 173 to 176° C. under 0.05 mm. Hg pressure. Its hydrochloride sinters at 203° C. and melts at 205–207° C. with decomposition.

The 1 - oxo - 3-benzoyl - 2,3,4,4a,5,6-hexahydro-1H-pyrazino[1,2-a]quinoline used as starting material can be prepared in the following manner:

40 grams of 2 - (benzoylaminomethyl) - 1,2,3,4-tetrahydroquinoline and 12 g. of absolute pyridine are dissolved in 600 ml. of absolute dioxane, and a solution of 18 g. of chloracetylchloride in 40 ml. of absolute dioxane is stirred in at room temperature. The batch is stirred for 3 hours at room temperature, kept for 12 hours, filtered and water is added until crystals no longer settle out. The solid substance is suctioned off, dried and recrystallized from ethanol, to yield 1-chloroacetyl-2-(benzoylaminomethyl)-1,2,3,4-tetrahydroquinoline in the form of colourless crystals melting at 156 to 158° C.

A solution of 57 g. of the above compound in a mixture of 900 ml. of absolute dioxane and 150 ml. of dimethylformamide is mixed with 12 g. of 50% sodium hydride in paraffin oil. The batch is heated for 3 days at 100° C., allowed to cool, the precipitated sodium chloride is filtered off and the filtrate is evaporated under vacuum. The oily residue is boiled with 4× 200 ml. of petroleum ether and the solvent decanted. The oily residue freed from paraffin oil is dissolved in a little warm ethanol and then cooled, whereupon 1-oxo-3-benzoyl-1,2,3,4,4a,5,6-hexahydro-1H-pyrazino[1,2-a]quinoline settles out in the form of colourless crystals melting at 127 to 129° C.

Example 2

A suspension of 5 g. of lithium-aluminium hydride in 250 ml. of absolute dioxane is stirred and heated to 80° C., and a solution of 10 g. of 3-(para-methoxybenzoyl)-2,3,4,4a,5,6-hexahydro-1H-pyrazino[1,2-a]quinoline in 50 ml. of absolute dioxane is added dropwise. The batch is stirred on for 6 hours at 100° C., cooled with an ice bath, and 10 ml. of water are dropped in. The mixture is stirred for 2 hours, filtered, rinsed with dioxane and the filtrate is evaporated under vacuum. The oily residue is caused to crystallize with ethanol+petroleum ether, to yield 3-(para - methoxybenzyl) - 2,3,4,4a,5,6 - hexahydro-1H-pyrazino[1,2-a]quinoline of the formula

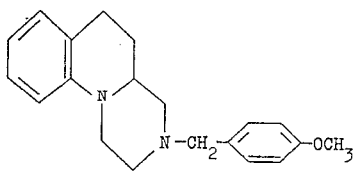

in the form of faintly brownish crystals melting at 65 to 68° C.

The hydrochloride melts and decomposes at 238 to 240° C.

The 3 - (para-methoxybenzoyl)-2,3,4,4a,5,6-hexahydro-1H-pyrazino[1,2-a]quinoline used as starting material can be prepared in the following manner:

A solution of 20 g. of 3-benzyl-2,3,4,4a,5,6-hexahydro-1H-pyrazino[1,2-a]quinoline in 100 ml. of ethanol and 50 ml. of glacial acetic acid is hydrogenated in the presence of 1 g. of palladium carbon of 10% strength until the theoretical quantity of hydrogen has been absorbed. The catalyst is filtered off, the filtrate evaporated under vacuum, the residue taken up with water, alkalinized with concentrated ammonia and extracted with methylenechloride. The methylenechloride residue is distilled under a high vacuum, to yield 2,3,4,4a,5,6 - hexahydro - 1H-pyrazino[1,2-a]quinoline in the form of a faintly yellowish oil, boiling at 126 to 133° C. under 0.3 mm. Hg pressure; its hydrochloride melts and decomposes at 192 to 194° C.

A solution of 7 g. of 2,3,4,4a,5,6-hexahydro-1H-pyrazino[1,2-a]quinoline and 3.6 g. of pyridine in 100 ml. of absolute dioxane is mixed with 7.6 g. of para-methoxybenzoylchloride and kept for 3 hours at room temperature, then evaporated under vacuum, saturated sodium bicarbonate solution is added and the whole is agitated with methylenechloride. The methylenechloride layer is washed with water, dried over sodium sulphate and evaporated under vacuum, to yield an oily residue which is taken up in ether and allowed to crystallize, to yield 3-(para-methoxybenzoyl) - 2,3,4,4a,5,6 - hexahydro - 1H-pyrazino[1,2-a]quinoline melting at 107 to 109° C.

Example 3

A suspension of 5 g. of lithium-aluminium hydride in 200 ml. of absolute dioxane is stirred and heated to 80° C. and a solution of 9.5 g. of 3-((para-chlorobenzoyl)-2,3,4,4a,5,6-hexahydro-1H-pyrazino[1,2-a]quinoline in 50 ml. of absolute dioxane is dropped in. The batch is stirred for another 6 hours at 100° C., then cooled with an ice bath and 10 ml. of water are dropped in. After two hours' stirring the whole is filtered, rinsed with dioxane and the filtrate evaporated under vacuum; the oily residue is crystallized from ethanol+petroleum ether, to yield 3-(para-chlorobenzyl)-2,3,4,4a,5,6-hexahydro-1H-pyrazino[1,2-a]quinoline of the formula

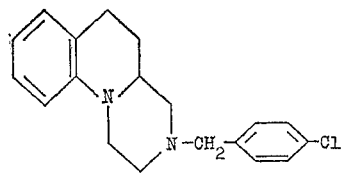

which after recrystallization from ethanol+petroleum ether melts at 86 to 88° C.

The 3-(para-chlorobenzyl)-2,3,4,4a,5,6-hexahydro-1H-pyrazino[1,2-a]quinoline hydrochloride is a white powder melting at 256 to 258° C. with decomposition.

The 3-(para-chlorobenzoyl)-2,3,4,4a,5,6-hexahydro-1H-pyrazino[1,2-a]quinoline used as starting material can be prepared by the method described in Example 2 for the manufacture of 3 - (para-methoxybenzoyl)-2,3,4,4a,5,6-hexahydro-1H-pyrazino[1,2-a]quinoline from 2,3,4,4a,5,6-hexahydro-1H-pyrazino[1,2-a]quinoline and para-chlorobenzoylchloride; it melts at 138 to 140° C.

Example 4

A suspension of 5 g. of lithium-aluminium hydride in 200 ml. of absolute dioxane is stirred and heated to 80° C., and a solution of 9 g. of 3-(para-toluoyl)-2,3,4,4a,5,6-hexahydro-1H-pyrazino[1,2-a]quinoline in 50 ml. of absolute dioxane is dropped in. The batch is stirred on for 6 hours at 100° C., then cooled with an ice bath, and 10 ml. of water are dropped in. After stirring for 2 hours the batch is filtered, rinsed with dioxane, and the filtrate is evaporated under vacuum. The oily residue is crystallized from ethanol+petroleum ether, to yield 3-(para-tolyl) - 2,3,4,4a,5,6 - hexahydro - 1H - pyrazino[1,2-a]quinoline of the formula

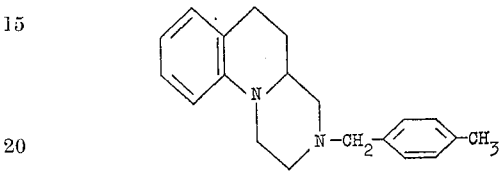

as a faintly yellowish oil which boils at 135 to 140° C. under 0.1 mm. Hg pressure.

The 3-(para-tolyl)-2,3,4,4a,5,6-hexahydro-1H-pyrazino[1(2-a]quinoline hydrochloride melts and decomposes at 245 to 250° C.

The 3-(para-toluoyl)-2,3,4,4a,5,6-hexahydro-1H-pyrazino[1,2-a]quinoline used as starting material can be prepared by the method described in Example 2 for the manufacture of 3-(para-methoxybenzoyl)-2,3,4,4a,5,6-hexahydro-1H-pyrazino[1,2-a]quinoline from 2,3,4,4a,5,6-hexahydro-1H-pyrazino[1,2-a]quinoline and para-toluoylchloride and melts at 112 to 113° C.

Example 5

A suspension of 80 g. of lithium-aluminium hydride in 1 litre of absolute dioxane is stirred and heated to 80° C., and within 1½ hours a solution of 150 g. of 1-oxo-3-benzoyl - 8 - methyl - 2,3,4,4a,5,6 - hexahydro - 1H-pyrazino[1,2-a]quinoline in 80 ml. of absolute dioxane is dropped in. The batch is stirred on for 6 hours at 100° C., cooled with an ice bath, and 100 ml. of water are dropped in. The whole is stirred for 2 hours, filtered, rinsed with dioxane, and the filtrate is evaporated under vacuum and distilled under a high vacuum, to yield 3-benzyl - 8 - methyl - 2,3,4,4a,5,6 - hexahydro - 1H-pyrazino[1,2-a]quinoline of the formula

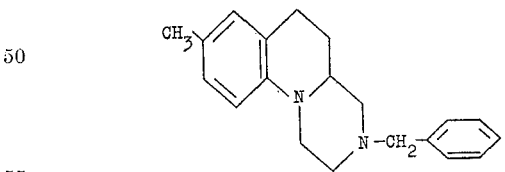

in the form of a faintly yellowish oil boiling at 140 to 145° C. under 0.07 mm. Hg pressure. Its hydrochloride melts and decomposes at 126 to 128° C.

The 1-oxo-3-benzoyl-8-methyl-2,3,4,4a,5,6-hexahydro-1H-pyrazino[1,2-a]quinoline used as starting material can be prepared thus:

A solution of 490 g. of 1-benzoyl-2-cyano-6-methyl-1,2-dihydroquinoline in 3 litres of ethyl acetate is completely hydrogenated with 30 g. of Raney nickel in a 5-litre autoclave under 120 atmospheres (gauge) at 116° C. After cooling, the catalyst is filtered off, the filtrate evaporated to 1.5 litres and the precipitated crystals are suctioned off, to yield 2-(benzoylaminomethyl)-6-methyl-1,2,3,4-tetrahydroquinoline melting at 130 to 132° C.

300 grams of the above compound and 95 g. of pyridine are dissolved in 3.5 litres of absolute dioxane and a solution of 138 g. of chloracetylchloride in ½ liitre of absolute dioxane is vigorously stirred in at room temperature. The batch is stirred for 3 hours at room temperature, then mixed with 3 litres of water, and the precipitated crystals are suctioned off, washed with water, taken up in methylenechloride, washed with water, dried over sodium sulphate and evaporated under vacuum. The residue is taken up in 2 litres of ether, whereupon crystallization sets in, to yield 1-chloroacetyl-2-(benzoylaminomethyl)-6-methyl-1,2,3,4-tetrahydroquinoline in the form of almost colourless crystals melting at 127 to 129° C.

100 grams of the above compound are dissolved in 250 ml. of dimethylformamide and within 20 minutes stirred dropwise into a suspension of 20 g. of sodium hydride (50% in paraffin oil) in ½ litre of dimethylformamide. When hydrogen is no longer being absorbed, the reaction solution is filtered through diatomaceous earth; the filtrate is mixed with 200 ml. of water and extracted twice with 1 litre of petroleum ether. The dioxane+water layer is diluted with 1 litre of water and extracted with 3× 400 ml. of methylenechloride. The organic phase is dried over sodium sulphate and evaporated under vacuum. The residue is dissolved in 200 ml. of ethanol and 300 ml. of ether are added, whereupon crystallization sets in, to yield 1-oxo-3-benzoyl-8-methyl-2,3,4,4a,5,6 - hexahydro - 1H - pyrazino[1,2-a]quinoline in the form of faintly brownish crystals melting at 134 to 135° C.

Example 6

A suspension of 21.6 g. of lithium-aluminium hydride in 960 ml. of absolute dioxane is stirred and heated to 80° C., and a solution of 39.6 g. of 1-oxo-3-benzoyl-8-methoxy-2,3,4,4a,5,6 - hexahydro-1H-pyrazino[1,2-a]quinoline in 120 ml. of absolute dioxane is dropped in. The mixture is stirred for another 6 hours at 90° C., then cooled in an ice bath and 36 ml. of water are dropped in. The batch is stirred for 2 hours, filtered, rinsed with dioxane and the filtrate is evaporated under vacuum, the oily residue is taken up in ether and allowed to crystallize. After filtration 3 - benzyl - 8 - methoxy - 2,3,4,4a,5,6 - hexahydro-1H-pyrazino[1,2-a]quinoline of the formula

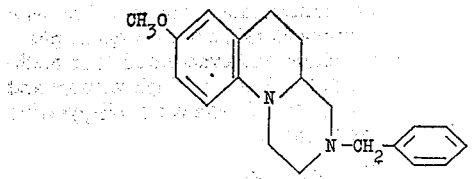

is obtained in faintly grownish crystals melting at 76 to 77° C.

The 1 - oxo - 3 - benzoyl - 8 - methoxy - 2,3,4,4a,5,6-hexahydro-1H-pyrazino[1,2-a]quinoline used as starting material is accessible as follows:

A solution of 100 g. of 2-(benzoylaminomethyl)-6-methoxy-1,2,3,4-tetrahydroquinoline and 27.5 g. of absolute pyridine in 1 litre of absolute dioxane is mixed with vigorous stirring at room temperature with a solution of 41.25 g. of chloracetylchloride in 150 ml. of absolute dioxane. The batch is stirred on for 3 hours at room temperature, then kept for 12 hours, filtered, and sufficient water is added to produce a turbidity of the solution. On seeding copious crystals settle out; after cooling, they are suctioned off, washed with water and dissolved in methylenechloride. The methylenechloride solution is concentrated to 500 to 600 ml., and while still warm mixed with petroleum ether until light-brown crystals settle out. These crystals are suctioned off, and dried, to yield 1 - chloracetyl - 2 - (benzoylaminomethyl) - 6-methoxy-1,2,3,4-tetrahydroquinoline in the form of faintly brownish crystals melting at 133 to 135° C.

55 grams of the above compound are dissolved in 110 ml. of dimethylformamide and stirred dropwise within 30 minutes into a suspension of 10.7 g. of 50% sodium hydride (in paraffin oil) in 420 ml. of dimethylformamide. When hydrogen is no longer being absorbed, the reaction solution is filtered through diatomaceous earth, 2 litres of water are added to the filtrate and it is extracted with methylenechloride. The methylenechloride solution is dried over sodium sulphate and evaporated in a rotary evaporator under vacuum at 50° C. The residue is taken up in ethanol and cooled, whereupon 1-oxo-3-benzoyl-8-methoxy - 2,3,4,4a,5,6 - hexahydro - 1H - pyrazino[1,2-a]quinoline melting at 118 to 120° C. crystallize out.

Example 7

A suspension of 6 g. of lithium-aluminium hydride in 250 ml. of absolute dioxane is heated to 80 to 90° C. and a solution of 13 g. of 3-(phenylacetyl)-2,3,4,4a,5,6-hexahydro-1H-pyrazino[1,2-a]quinoline in 50 ml. of absolute dioxane is stirred in dropwise. The batch is stirred on for 5 hours at 90 to 100° C., then cooled with an ice bath, 12 ml. of water are dropped in and the whole is stirred on for 2 hours at room temperature. The reaction mixture is filtered, rinsed with dioxane and the filtrate is evaporated under vacuum. The residue is distilled under a high vacuum and yields 3-(β-phenylethyl)-2,3,4,4a,5,6-hexahydro-1H-pyrazino[1,2-a]quinoline of the formula

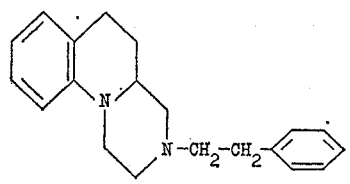

in the form of a faintly brownish oil boiling at 190 to 200° C. under 0.5 mm. Hg pressure.

The 3 - phenylacetyl - 2,3,4,4a,5,6 - hexahydro - 1H-pyrazino[1,2-a]quinoline used as starting material can be prepared thus:

A solution of 9.5 g. of 2,3,4,4a,5,6-hexahydro-1H-pyrazino[1,2-a]quinoline and 4 g. of absolute pyridine in 100 ml. of absolute dioxane is cooled to 10° C., and a solution of 8 g. of phenylacetylchloride in 30 ml. of absolute dioxane is stirred in. The batch is kept for 12 hours at room temperature, evaporated under vacuum, mixed with ice and extracted with methylenechloride. The methylenechloride residue yields 3-phenylacetyl-2,3,4,4a,5,6-hexahydro-1H-pyrazino[1,2-a]quinoline in the form of a thickly liquid oil which can be used as it is for the reduction with lithium-aluminium hydride.

Example 8

A suspension of 7 g. of lithium-aluminium hydride in 250 ml. of absolute dioxane is heated to 80 to 90° C. and a solution of 16 g. of 3-(β-phenylpropionyl)-2,3,4,4a,5,6-hexahydro-1H-pyrazino[1,2-a]quinoline in 50 ml. of absolute dioxane is stirred in dropwise. The whole is stirred for 5 hours at 90 to 100° C., then cooled with an ice bath, 15 ml. of water are dropped in and the mixture is stirred on for 2 hours at room temperature, then filtered, rinsed with dioxane and the filtrate is evaporated under vacuum. The residue is distilled under a high vacuum and furnishes 3 - (γ-phenylpropyl)-2,3,4,4a,5,6-hexahydro-1H-pyrazino[1,2-a]quinoline of the formula

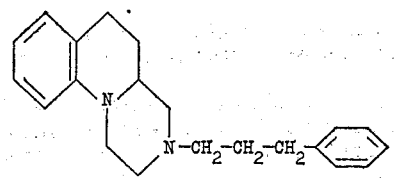

in the form of a faintly brownish oil boiling at 200 to 205° C. under a pressure of 0.5 mm. Hg.

The 3-(β-phenylpropionyl)-2,3,4,4a,5,6-hexahydro-1H-pyrazino[1,2-a]quinoline used as starting material is accessible by the method described in Example 7 for the preparation of 3-(phenylacetyl) - 2,3,4,4a,5,6-hexahydro-1H-pyrazino[1,2-a]quinoline in the form of an oil.

Example 9

A suspension of 6 g. of lithium-aluminium hydride in 200 ml. of absolute dioxane is stirred and heated to 80° C., and a solution of 11 g. of 3-(2-furoyl)-2,3,4,4a,5,6-hexahydro-1H-pyrazino[1,2-a]quinoline in 50 ml. of absolute dioxane is added dropwise. The batch is stirred on for 6 hours at 100° C., then cooled with an ice bath, and 12 ml. of water are dropped in. The whole is stirred for 2 hours, filtered, rinsed with dioxane and the filtrate is evaporated under vacuum. The oily residue is crystallized from ethanol+petroleum ether, to yield 3-furfuryl-2,3,4,4a,5,6-hexahydro-1H-pyrazino[1,2-a]quinoline of the formula

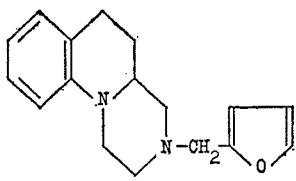

in the form of a faintly yellowish oil boiling at 160 to 170° C. under 0.2 mm. Hg pressure.

The hydrochloride melts and decomposes at 167 to 168° C.

The 3-(2-furoyl)-2,3,4,4a,5,6-hexahydro-1H-pyrazino-[1,2-a]quinoline used as starting material can be prepared by the method described in Example 2 for the manufacture of 3-(para-methoxybenzoyl)-2,3,4,4a,5,6-hexahydro-1H-pyrazino[1,2-a]quinoline from 2,3,4,4a,5,6-hexahydro-1H-pyrazino[1,2-a]quinoline and furan-2-carboxylic acid chloride. It is a thickly liquid, faintly yellowish oil which can be used in the crude state for the reduction with lithium-aluminium hydride.

Example 10

A suspension of 5 g. of lithium-aluminium hydride in 250 ml. of absolute dioxane is stirred and heated to 80° C., and a solution of 8 g. of 3-(2-thenoyl)-2,3,4,4a,5,6-hexahydro-1H-pyrazino[1,2-a]quinoline in 50 ml. of absolute dioxane is dropped in. The batch is stirred on for 6 hours at 100° C., then cooled with an ice bath, and 10 ml. of water are dropped in. After stirring for 2 hours the reaction mixture is filtered, rinsed with dioxane and the filtrate evaporated under vacuum. The oily residue is crystallized from alcohol+petroleum ether, to yield 3-(2-thenoyl) - 2,3,4,4a,5,6-hexahydro-1H-pyrazino[1,2-a]quinoline of the formula

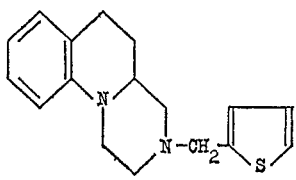

in the form of faintly brownish crystals melting at 57 to 59° C.

The hydrochloride melts and decomposes at 208 to 210° C.

The 3-(2-thenoyl)-2,3,4,4a,5,6-hexahydro-1H-pyrazino-[1,2-a]quinoline used as starting material can be prepared thus:

A solution of 7 g. of 2,3,4,4a,5,6-hexahydro-1H-pyrazino[1,2-a]quinoline and 3.6 g. of absolute pyridine in 100 ml. of absolute dioxane is mixed with 6.5 g. of thiophene-2-carboxylic acid chloride and kept for 16 hours at room temperature, then evaporated under vacuum, and the residue is mixed with ice and saturated sodium bicarbonate solution, extracted with methylenechloride and washed with water. The methylenechloride solution is dried over sodium sulphate and evaporated under vacuum, the residue can be crystallized from ether to yield 3-(2-thenoyl)-2,3,4,4a,5,6-hexahydro-1H-pyrazino[1,2-a]quinoline melting at 130 to 132° C.

Example 11

A solution of 95 g. of 3-benzyl-8-methyl-2,3,4,4a,5,6-hexahydro - 1H-pyrazino[1,2-a]quinaoline in ½ liter of ethanol is mixed with 250 ml. of glacial acetic acid and 300 ml. of ethanolic 8 N-hydrochloric acid and in the presence of 4 g. of palladium carbon of 10% strength hydrogenated until the theoretical amount of hydrogen has been absorbed. The catalyst is filtered off, the filtrate evaporated under vacuum, and the residue is mixed with ice water and adjusted to an alkaline reaction with 10 N-sodium hydroxide solution. The base is extracted with methylenechloride, and the organic phase is washed with water, dried over magnesium sulfate and evaporated under vacuum. The methylenechloride residue yields on distillation under a high vacuum the 8-methyl-2,3,4,4a,5,6-hexahydro-1H-pyrazino[1,2-a]quinoline of the formula

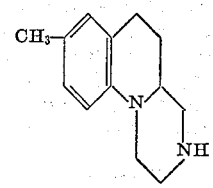

as a faintly yellowish oil boiling at 95 to 100° C. under 0.07 mm. Hg pressure. Its hydrochloride melts at 186 to 188° C.

Example 12

A solution of 60 g. of 3-benzyl-8-methoxy-2,3,4,4a,5,6-hexahydro - 1H - pyrazino[1,2-a]quinoline in 30 ml. of ethanol is mixed with 136 ml. of glacial acetic acid and 16.5 ml. of 8 N-alcoholic hydrochloric acid and in the presence of 3 g. of palladium carbon of 10% strength hydrogenated until the theoretical quantity of hydrogen has been absorbed. The catalyst is filtered off, the filtrate evaporated under vacuum, the residue mixed with ice water and alkalinized with concentrated ammonia. The base is extracted with methylene-chloride and the organic phase dried over magnesium sulfate and evaporated. The methylenechloride residue is distilled under a high vacuum and yields 8 - methoxy - 2,3,4,4a,5,6-hexahydro-1H-pyrazino [1,2-a]quinoline of the formula

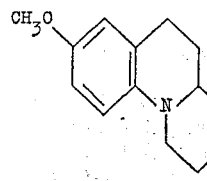

as a faintly yellowish oil boiling at 108 to 110° C. under 0.1 mm. Hg pressure. Its hydrochloride melts at 235 to 237° C.

Example 13

A mixture of 7 g. of 8-methoxy-2,3,4,4a,5,6-hexahydro-1H-pyrazino[1,2-a]quinoline, 140 ml. of 48% hydrobromic acid and 1.5 ml. of hypophosphorus acid is refluxed for 16 hours, then evaporated to dryness and the solid residue is crystallized from methanol+ether, to yield 8-hydroxy - 2,3,4,4a,5,6 - hexahydro - 1H - pyrazino[1,2-a] quinoline hydrobromide of the formula

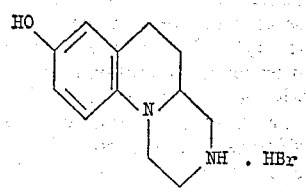

in the form of faintly brownish crystals which melt and decompose at 278 to 280° C.

The free base melts at 190° C. and its hydrochloride at 250° C. with decomposition.

Example 14

A suspension of 6 g. of lithium-aluminium hydride in 150 ml. of absolute dioxane is heated to 80 to 90° C. and a solution of 9.8 g. of 3-acetyl-2,3,4,4a,5,6-hexahydro-1H-pyrazino[1,2-a]quinoline in 50 ml. of absolute dioxane is stirred in dropwise. The batch is stirred on for 5 hours at 100° C. and then kept for 12 hours at room temperature, then cooled with an ice bath, and 12 ml. of water are dropped in; the whole is stirred for 2 hours, filtered and rinsed with dioxane. The combined dioxane solutions are evaporated under vacuum and the residue distilled under a high vacuum, to yield 3-ethyl-2,3,4,4a,5,6-hexahydro-1H-pyrazino[1,2-a]quinoline of the formula

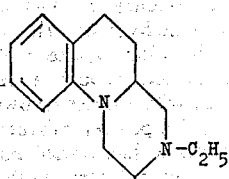

in the form of a faintly yellowish oil boiling at 108 to 109° C. under 0.5 mm. Hg pressure.

The hydrochloride melts at 214 to 215° C. with decomposition.

The 3 - acetyl - 2,3,4,4a,5,6 - hexahydro - 1H - pyrazino [1,2-a]quinoline used as starting material is accessible thus:

A solution of 9.4 g. of 2,3,4,4a,5,6-hexahydro-1H-pyrazino[1,2-a]quinoline and 7.9 g. of absolute pyridine in 50 ml. of absolute dioxane is mixed with 10.2 g. of acetic anhydride, stirred for one hour at room temperature and then for 1 hour at 70° C., then evaporated under vacuum, mixed with ice water and extracted with methylenechloride. The methylenechloride solution is agitated with sodium bicarbonate solution and water, dried over magnesium sulphate and evaporated under vacuum. The residue is taken up in ether with heating. On cooling, 3-acetyl-2,3,4,4a,5,6 - hexahydro -1H - pyrazino[1,2-a]quinoline, melting at 97 to 98° C., crystallizes out.

Example 15

A suspension of 6 g. of lithium-aluminium hydride in 200 ml. of absolute dioxane is heated to 80 to 90° C. and a solution of 12 g. of 3 - butyryl-2,3,4,4a5,6-hexahydro-1H - pyrazino[1,2-a]quinoline in 50 ml. of absolute dioxane is stirred in dropwise. The batch is stirred on for 5 hours at 100° C. and than kept for 12 hours at room temperature, cooled with an ice bath, 12 ml. of water are dropped in, stirred for 2 hours, filtered and rinsed with dioxane. The combined dioxane solutions are evaporated under vacuum; on distillation under a high vacuum the residue yields 3-butyl - 2,3,4,4a,5,6-hexahydro-1H-pyrazino[1,2-a]quinoline of the formula

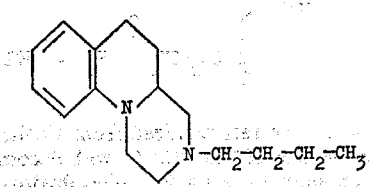

in the form of a faintly yellowish oil boiling at 120° C. under 0.5 mm. Hg pressure.

The 3-butyl-2,3,4,4a,5,6-hexahydro-1H-pyrazino[1,2-a] quinoline hydrochloride melts at 167 to 168° C. with decomposition.

The 3-butyryl-2,3,4,4a,5,6-hexahydro - 1H - pyrazino-[1,2-a]quinoline used as starting material can be prepared as described in Example 14 for the manufacture of 3-acetyl-2,3,4,4a,5,6-hexahydro - 1H - pyrazino[1,2-a]quinoline. It forms an oil.

Example 16

A solution of 19 g. of 2,3,4,4a,5,6-hexahydro-1H-pyrazino[1,2-a]quinoline, 21 g. of para-toluenesulphonic acid methyl ester and 15 g. of N,N - diisopropylethylamine in 250 ml. of absolute toluene is stirred for 16 hours at 80° C., then cooled, filtered and the filtrate is evaporated under vacuum. The residue is dissolved in 2 N-hydrochloric acid, treated with animal charcoal, filtered, mixed with 10 N - sodium hydroxide solution and taken up in methylenechloride. The methylenechloride residue is dissolved in ethanol, adjusted to pH 4 with ethanolic 8 N-hydrochloric acid and ether is added, whereupon crystallization sets in Recrystallization of the precipitate from ethanol+ether furnishes 3 - methyl-2,3,4,4a,5,6-hexahydro-1H-pyrazino-[1,2-a]quinoline hydrochloride of the formula

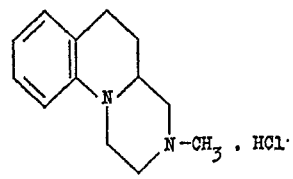

in the form of colourless crystals melting at 226 to 228° C.

Example 17

A suspension of 7 g. of lithium aluminium hydride in 250 ml. of absolute dioxan is heated with stirring to 80° C., and treated dropwise with a solution of 15 g. of 3-(2-furoyl)-8-methyl - 2,3,4,4a5,6 - hexahydro-1H-pyrazino-[1,2-a]quinoline in 50 ml. of absolute dioxan. The batch is stirred for 6 hours at 90° C., cooled with an ice-bath and treated dropwise with 14 ml. of water. After being stirred for 2 hours, the batch is filtered, rinsed with dioxan and the filtrate evaporated in vacuo. Distillation of the oily residue in a high vacuum yields 3-furfuryl-8-methyl-2,3,4,4a,5,6-hexahydro - 1H - pyrazino[1,2-a]quinoline of the formula

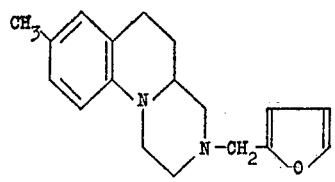

in the form of a faintly yellow oil boiling at 160–165° C., under 0.2 mm. pressure of mercury. The hydrochloride melts at 157–159° C. with decomposition.

The 3-(2-furoyl) - 8 - methyl-2,3,4,4a,5,6-hexahydro-1H-pyrazino[1,2-a]quinoline used as starting material may be prepared by the method described in Example 2 for the preparation of 3-(para-methoxybenzoyl)-2,3,4,4a,5,6-hexahydro-1H-pyrazino[1,2-a]quinoline from 8-methyl-2,3,4,4a,5,6-hexahydro - 1H - pyrazino[1,2-a]quinoline and furan-2-carboxylic acid chloride. It is a viscous faintly yellow oil which may be used as crude product for the reduction with lithium aluminium hydride.

Example 18

A solution of 6.3 g. of 2,3,4,4a,5,6-hexahydro-1H-pyrazino[1,2-a]quinoline, 7.5 g. of 3,4,5-trimethoxybenzyl chloride and 4 g. of triethylamine in 50 ml. of absolute ethanol is allowed to stand for 24 hours at room temperature. The batch is evaporated in vacuo, the residue is taken up in methylene chloride and extracted with saturated sodium carbonate solution and with water. The methylene chloride residue is recrystallized from petroleum ether and yields 3-(3,4,5-trimethoxybenzyl)-2,3,4,4a,5,6-hexahydro-1H-pyrazino[1,2-a]quinoline of the formula

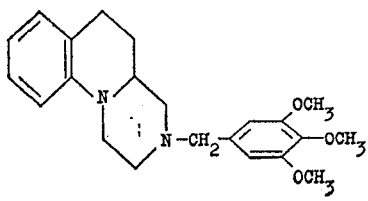

in the form of colourless crystals melting at 112–114° C.

Example 19

A solution of 7.5 g. of 2,3,4,4a,5,6-hexahydro-1H-pyrazino[1,2-a]quinoline, 8.4 g. of 2-phenyl-4-(chloromethyl)-thiazole and 4.5 g. of triethylamine in 80 ml. of absolute ethanol is allowed to stand for 48 hours at room temperature. The batch is then evaporated in vacuo, the residue taken up in methylene chloride and washed with saturated sodium carbonate solution and with water. The ether residue is recrystallized from ethanol, to yield 3-[(2-phenyl-4-thiazolyl)-methyl] - 2,3,4,4a,5,6-hexahydro-1H-pyrazino[1,2-a]quinoline of the formula

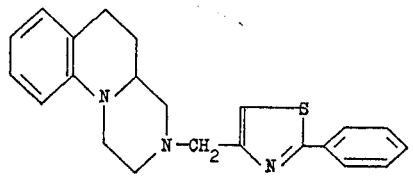

in the form of colourless crystals melting at 96–98° C.
The hydrochloride melts at 195–196° C. with decomposition.

Example 20

A solution of 5 g. of 2,3,4,4a,5,6-hexahydro-1H-pyrazino[1,2-a]quinoline, 3.3 g. of 2-vinyl-pyridine and 0.1 ml. of glacial acetic acid in 150 ml. of absolute toluene is boiled under reflux for 16 hours. The batch is evaporated in vacuo, the residue taken up in ether and extracted with saturated sodium carbonate solution and with water. The ethereal solution is dried over sodium sulphate, evaporated in vacuo and the residue distilled in a high vacuum, to yield 3-[2-(2-pyridyl)-ethyl]-2,3,4,4a,5,6-hexahydro-1H-pyrazino[1,2-a]quinoline of the formula

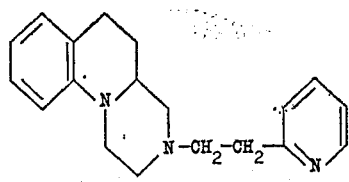

in the form of a faintly yellow oil boiling at 190–200° C. under 0.1 mm. pressure of mercury.

Example 21

In a similar manner to that described in Example 1 3-benzyl-8-chloro - 2,3,4,4a,5,6 - hexahydro - 1H - pyrazino[1,2-a]quinoline and 3-benzyl-8-fluoro - 2,3,4,4a,5,6-hexahydro-1H-pyrazino[1,2-a]quinoline and their hydrochlorides may be obtained.

Example 22

Tablets, each containing 50 mg. of 3-benzyl-2,3,4,4a,5,6-hexahydro - 1H-pyrazino[1,2-a]quinoline hydrochloride, can be formulated for instance from the following ingredients:

Ingredients of the tablet: Mg.
3-benzyl-2,3,4,4a,5,6-hexahydro - 1H - pyrazino[1,2-a]quinoline hydrochloride _____ 50
Wheat starch _____ 40
Lactose _____ 70
Colloidal silica _____ 10
Talcum _____ 10
Magnesium stearate _____ 1
Arrowroot _____ 19

200

Preparation.—The 3-benzyl-2,3,4,4a,5,6-hexahydro-1H-pyrazino[1,2-a]quinoline hydrochloride is mixed with part of the wheat starch, with lactose and colloidal silica and the mixture is passed through a sieve. The residual wheat starch is pasted with 5 times its own weight of water on a water bath and the powder mixture is kneaded with the paste until the whole has turned into a plastic mass which is pressed through a 3 mm. mesh sieve, dried, and the dry granulate is once more passed through a sieve, then mixed with the arrowroot, talcum and magnesium stearate and the mixture is pressed into tablets of 200 mg. weight each.

In an analogous manner it is possible to manufacture tablets containing the hydrochlorides described in the preceding examples, especially 3-butyl - 2,3,4,4a,5,6 - hexahydro-1H-pyrazino[1,2-a]quinoline hydrochloride, 3-ethyl-2,3,4,4a,5,6-hexahydro - 1H - pyrazino[1,2-a]quinoline hydrochloride, 3-(furfuryl) - 2,3,4,4a,5,6 - hexahydro-1H-pyrazino[1,2-a]quinoline hydrochloride or 3-(2-thenyl)-2,3,4,4a,5,6-hexahydro - 1H - pyrazino[1,2-a]quinoline hydrochloride.

Example 23

In a similar manner to that described in Examples 11 and 12 8-chloro - 2,3,4,4a,5,6 - hexahydro-1H-pyrazino[1,2-a]quinoline and 8-fluoro - 2,3,4,4a,5,6 - hexahydro-1H-pyrazino[1,2-a]quinoline and their hydrochlorides may be obtained.

Example 24

A solution of 9.4 g. of 2,3,4,4a,5,6-hexahydro-1H-pyrazino[1,2-a]quinoline in 100 ml. of absolute benzene is mixed with 3.9 g. of methylvinylketone and kept for 16 hours at room temperature, then evaporated under vacuum; the residue is taken up in 5 ml. of ethanol, rendered weakly acid by being mixed with ethanolic hydrochloric acid and ether is added until a turbidity appears. After a short time 3(3-oxobutyl)-2,3,4,4a,5,6-hexahydro-1H-pyrazino[1,2-a]quinoline hydrochloride of the formula

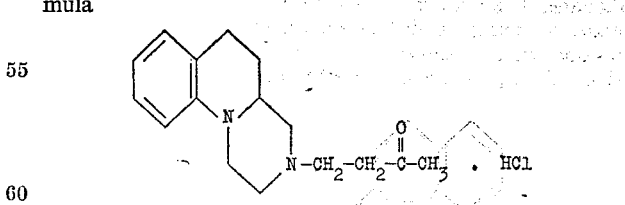

settles out and can be recrystallized from alcohol+ether, whereupon it melts at 181 to 182° C. with decomposition.

Free 3-(3-oxobutyl) - 2,3,4,4a,5,6-hexahydro-1H-pyrazino[1,2-a]quinoline is accessible in the usual manner from the hydrochloride; it forms a thickly liquid oil.

Example 25

A solution of 10 g. of 8-methyl-2,3,4,4a,5,6-hexahydro-1H-pyrazino[1,2-a]quinoline in 150 ml. of absolute benzene is mixed with 5 g. of methylvinylketone and kept for 16 hours at room temperature, then diluted with 150 ml. of absolute ethanol, adjusted to pH 4 with ethanolic 8 N-hydrochloric acid, evaporated under vacuum and the solid residue is crystallized from ethanol+ether, to yield 3-(3-oxobutyl)-8-methyl - 2,3,4,4a,5,6 - hexahydro-1H-pyrazino[1,2-a]quinoline hydrochloride of the formula

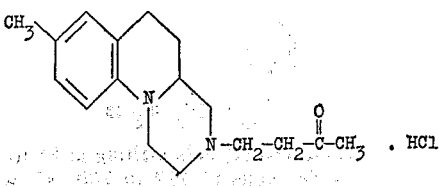

in the form of colorless crystals melting at 157 to 159° C. with decomposition.

Example 26

A solution of 7 g. of 8-methoxy-2,3,4,4a,5,6-hexahydro-1H-pyrazino[1,2-a]quinoline in 70 ml. of absolute benzene is mixed with 2.92 g. of methylvinylketone and kept for 16 hours at room temperature, then ethanolic 8 N-hydrochloric acid is added up to pH 3 to 4. The precipitated crystals are filtered off and recrystallized from ethanol+ +ether, to yield 3-(3-oxobutyl)-8-methoxy - 2,3,4,4a,5,6-hexahydro - 1H - pyrazino[1,2-a]quinoline hydrochloride of the formula

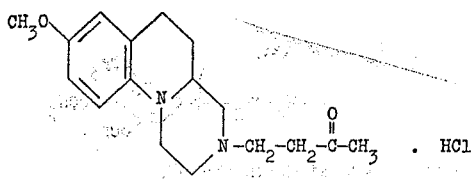

which melts at 198 to 200° C. with decomposition.

Example 27

A solution of 5.60 g. of 2,3,4,4a,5,6-hexahydro-1H-pyrazino[1,2-a]quinoline and 3.2 g. of triethylamine in 100 ml. of absolute ethanol is mixed with 6 g. of ω-bromoacetophenone and kept for 2 hours at room temperature, then evaporated under vacuum, and the residue is mixed with ice-cold sodium carbonate solution and extracted with methylenechloride. The methylenechloride layer is washed with water, dried over sodium sulfate and evaporated. The residue is dissolved in warm ether, treated with animal carbon and filtered while still warm. On cooling, crystallization sets in, to furnish 3-phenacyl-2,3,4,4a,5,6-hexahydro-1H-pyrazino[1,2-a]quinoline of the formula

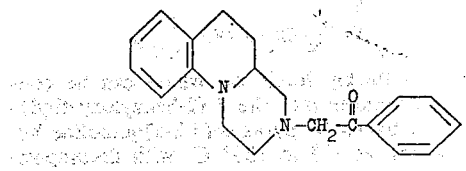

in the form of faintly brownish crystals melting at 93 to 94° C. The hydrochloride melts at 224 to 226° with decomposition.

Example 28

A solution of 7 g. of 3-(3-oxobutyl)-2,3,4,4a,5,6-hexahydro-1H-pyrazino[1,2-a]quinoline in 30 ml. of methanol is dropped into a stirred solution, cooled to 5° C., of 2 g. of sodium borohydride in 20 ml. of methanol. The mixture is stirred for half an hour, then mixed with water and extracted with methylenechloride. The methylenechloride residue is dissolved in 2 N-hydrochloric acid, alkalinized with ammonia and the base is once more extracted with methylenechloride. The methylenechloride residue is recrystallized from ether+petroleum ether and yields 3-(3-hydroxybutyl)-2,3,4,4a,5,6-hexahydro-1H-pyrazino[1,2-a]quinoline of the formula

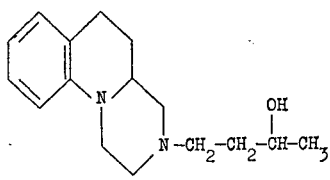

in colorless crystals melting at 106 to 107° C.

Example 29

A solution of 6 g. of 3-(3-hydroxybutyl)-2,3,4,4a,5,6-hexahydro-1H-pyrazino[1,2-a]quinoline and 3.25 g. of triethylamine in 100 ml. of absolute dioxane is mixed with 2.35 g. of acetylchloride and stirred for 3 hours at room temperature, then evaporated under vacuum, the residue is mixed with ice-cooled sodium carbonate solution and extracted with methylenechloride. The methylenechloride residue is dissolved in a little ethanol and adjusted to pH 4 with ethanolic 8 N-hydrochloric acid. Addition of ether until crystallization sets in furnishes 3-(3-acetoxybutyl) - 2,3,4,4a,5,6 - hexahydro-1H-pyrazino[1,2a]-quinoline hydrochloride of the formula

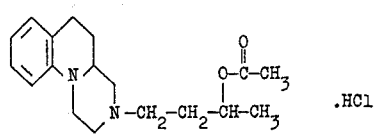

in the form of colourless crystals melting at 152 to 155° C. with decomposition.

Example 30

A solution of 6 g. of 3-(3-hydroxybutyl)-2,3,4,4a,5,6-hexahydro-1H-pyrazino[1,2-a]quinoline and 3.25 g. of triethyl amine in 100 ml. of absolute dioxane is mixed with 3.2 g. of butyrylchloride and stirred for 3 hours at room temperature, then evaporated under vacuum, the residue is mixed with ice-cooled sodium carbonate solution and extracted with methylene chloride. The methylenechloride residue is dissolved in a little ethanol and adjusted to pH 4 with ethanolic 8 N-hydrochloric acid. Ether is added until crystallization sets in, to furnish 3 - (3 - butyryloxybutyl) - 2,3,4,4a,5,6-hexahydro-1H-pyrazino[1,2-a]quinoline hydrochloride of the formula

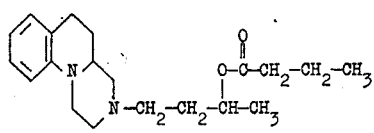

in the form of colourless crystals melting at 220° C. with decomposition.

Example 31

10 grams of 3-phenacyl-2,3,4,4a,5,6-hexahydro-1H-pyrazino[1,2-a]quinoline are stirred portionwise into a solution, cooled to 0 to 5° C., of 4 g. of sodium borohydride in 140 ml. of methanol. The batch is stirred on for 2 hours at 5° C. and then for 3 hours at room temperature. The reaction solution is mixed with 200 ml. of water, and the solid precipitate recrystallized from ethanol, to yield 3-(2-hydroxy-2-phenylethyl)-2,3,4,4a,5,6-hexahydro-1H-pyrazino[1,2-a]quinoline of the formula

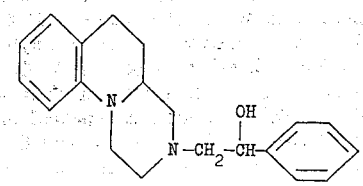

in colorless crystals melting at 115 to 117° C.
The hydrochloride melts at 212 to 215° C.

Example 32

A solution, cooled to 5° C. of methyl magnesium iodide in ether [prepared in the usual manner from 1.75 g. of magnesium chips and 10 g. of methyl iodide in 200 ml. of absolute ether] is mixed dropwise with a solution of 6 g. of 3-(3-oxobutyl)-2,3,4,4a,5,6-hexahydro-1H-pyrazino[1,2-a]quinoline in 50 ml. of absolute ether. The batch is stirred on for 1 hour under reflux and then left to itself for 16 hours. The reaction mixture is then poured out over 100 g. of ice and 200 ml. of saturated ammonium chloride solution are added. The ethereal phase is isolated and the aqueous phase is once more extracted with fresh ether, and the ethereal phases are washed with water, combined, dried over magnesium sulphate and evaporated under vacuum. The residue is taken up in hexane+ether and allowed to stand, whereupon 3-(3-hydroxy-3-methylbutyl)-2,3,4,4a,5,6-hexahydro-1H-pyrazino[1,2-a]quinoline of the formula

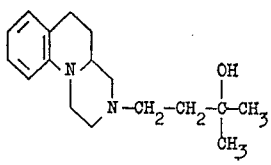

is obtained in colourless crystals melting at 78 to 79° C.

The hydrochloride melts and decomposes at 187 to 189° C.

Example 33

A solution of phenyl magnesium bromide in ether [prepared in the usual manner from 1.45 g. of magnesium chips and 9.3 g. of bromobenzene in 200 ml. of absolute ether] is cooled to 5° C. and mixed dropwise with a solution of 4.3 g. of 3-(3-oxobutyl)-2,3,4,4a,5,6-hexahydro-1H-pyrazino[1,2-a]quinoline in 50 ml. of absolute ether. The mixture is refluxed for 1 hour and then left to itself for 16 hours at room temperature, then poured out over 100 g. of ice and mixed with 200 ml. of saturated ammonium chloride solution. The ethereal phase is isolated and the aqueous phase once more extracted with 150 ml. of absolute ether. The combined ether extracts are washed with water, dried over magnesium sulphate and evaporated under vacuum. The oily residue is dissolved in a little ethanol and the solution is adjusted to pH 4 with ethanolic 8 N-hydrochloric acid. On cautious addition of ether 3-(3-hydroxy-3-phenylbutyl)-2,3,4,4a,5,6-hexahydro-1H-pyrazino[1,2-a]quinoline hydrochloride of the formula

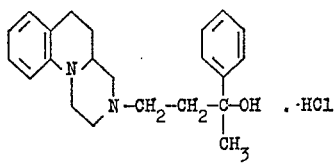

crystallizes out; it melts at 165 to 167° C. with decomposition.

The 3-(3-hydroxy-3-phenylbutyl)-2,3,4,4a,5,6-hexahydro-1H-pyrazino[1,2-a]quinoline obtained from the hydrochloride in the usual manner can be recrystallized from ether and melts at 113 to 115° C.

Example 34

A solution of 8 g. of 2,3,4,4a,5,6-hexahydro-1H-pyrazino[1,2-a]quinoline in 40 ml. of ethanol of 95% strength is cooled to 5° C. and mixed with 2 ml. of ethylene oxide. The mixture is left to itself for 1 hour at 5° C. and then for 30 minutes at room temperature, and then heated for 1 hour at 40° C. This operation is repeated once more with 2 ml. of ethylene oxide and at the end the batch is kept for 12 hours at room temperature, then evaporated under vacuum, and the residue is taken up in ethyl acetate, washed with water, dried over magnesium sulphate and once more evaporated. The residue is taken up in hexane+ether, whereupon crystallization sets in to yield 3-(2-hydroxyethyl)-2,3,4,4a,5,6-hexahydro-1H-pyrazino[1,2-a]quinoline of the formula

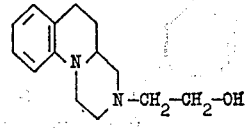

in the form of colourless crystals melting at 81 to 82° C.

The hydrochloride melts at 199 to 200° C. with decomposition.

Example 35

A solution of 3.2 g. of 3-(2-hydroxyethyl)-2,3,4,4a,5,6-hexahydro-1H-pyrazino[1,2-a]quinoline and 2 g. of triethylamine in 70 ml. of absolute dioxane is mixed with 4.2 g. of 3,4,5-trimethoxybenzoylchloride, then kept for 16 hours at room temperature, evaporated under vacuum, mixed with ice-cold sodium bicarbonate solution and extracted with ethyl acetate. The ethyl acetate layer is dried over magnesium sulphate and evaporated. The residue is dissolved with heating in ether. On cooling, crystalline 3-[2-(3,4,5-trimethoxybenzoyloxy)-ethyl]-2,3,4,4a,5,6-hexahydro-1H-pyrazino[1,2-a]quinoline of the formula.

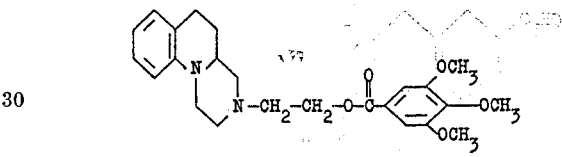

is obtained; it melts at 155 to 156° C.

The hydrochloride melts at 178 to 180° C. with decomposition.

Example 36

A suspension of 6 g. of lithium-aluminium hydride in 250 ml. of absolute dioxane is stirred and heated to 80° C., and mixed dropwise with a solution of 13 g. of 3-(α-benzyloxyacetyl)-2,3,4,4a,5,6-hexahydro-1H-pyrazino[1,2-a]quinoline in 50 ml. of absolute dioxane. The mixture is stirred on for 6 hours at 100° C., then cooled with an ice bath and 12 ml. of water are dropped in. The batch is stirred for 2 hours, filtered, rinsed with dioxane and the filtrate is evaporated under vacuum, to yield 3-(2-benzyloxyethyl)-2,3,4,4a,5,6-hexahydro-1H-pyrazino[1,2-a]quinoline of the formula

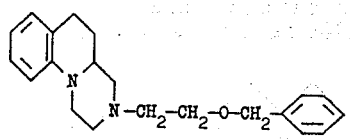

in the form of a thickly liquid oil which can be converted in known manner into the 3-(2-benzyloxyethyl)-2,3,4,4a,5,6-hexahydro-1H-pyrazine[1,2-a]quinoline hydrochloride melting at 133 to 135° C. with decomposition.

The 3-(α-benzyloxyacetyl)-2,3,4,4a,5,6-hexahydro-1H-pyrazino[1,2-a]quinoline used as starting material can be prepared from 7 g. of 2,3,4,4a,5,6-hexahydro-1H-pyrazino[1,2-a]quinoline and 8.5 g. of α-benzyloxyacetylchloride in 100 ml. of absolute dioxane in the presence of 3.6 g. of pyridine; it is a thickly liquid oil which can be used without previous purification for the reduction with lithium-aluminum hydride.

Example 37

A solution of 7 g. of 2,3,4,4a,5,6-hexahydro-1H-pyrazino[1,2-a]quinoline, 7 g. of acrylic acid ethyl ester and 0.1 ml. of glacial acetic acid in 100 ml. of absolute toluene is refluxed for 16 hours, then evaporated under vacuum, and the residue is taken up in ether and washed with saturated sodium carbonate solution and with water. Distillation of the ether residue under a high vacuum furnishes the 3-(2-carbethoxyethyl)2,3,4,4a,5,6-hexahydro-1H-pyrazino[1,2-a]quinoline of the formula

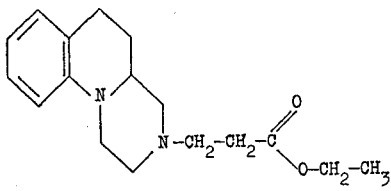

in the form of a faintly yellowish oil which boils at 160° C. under 0.2 Hg pressure.

The hydrochloride melts at 180 to 182° C.

Example 38

A solution of 7 g. of 2,3,4,4a,5,6-hexahydro-1H-pyrazino[1,2-a]quinoline and 3.8 g. of triethylamine in 100 ml. of ethanol is mixed with 6.3 g. of bromoacetic acid ethyl ester and kept for 5 hours at room temperature, then evaporated under vacuum, and the residue is mixed with ice-cold sodium carbonate solution and extracted with methylenechloride. The methylenechloride phase is washed with water, dried over sodium sulphate and evaporated. On distillation under a high vacuum the residue yields the 3-(carbethoxymethyl)-2,3,4,4a,5,6-hexahydro-1H-pyrazino[1,2-a]quinoline of the formula

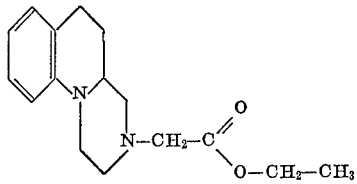

in the form of a faintly yellowish oil boiling at 170° C. under 0.2 mm. Hg pressure.

The hydrochloride melts at 180 to 182° C. with decomposition.

Example 39

A solution of 8 g. of 2,3,4,4a,5,6-hexahydro-1H-pyrazino[1,2-a]quinoline, 8 g. of acrylic acid n-butyl ester and 0.1 ml. of glacial acetic acid in 100 ml. of toluene is stirred for 16 hours at 100° C. The batch is then evaporated in vacuo, the residue taken up in ether and washed with saturated sodium carbonate solution and with water. The distillation of the ether residue in a high vacuum yields 3-(2-carbobutoxyethyl)-2,3,4,4a,5,6-hexahydro-1H - pyrazino-[1,2-a]quinoline of the formula

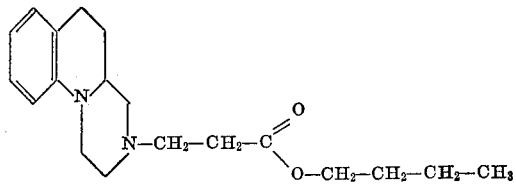

in the form of a faintly yellow oil boiling at 180 to 185° C. under 0.2 mm. pressure of mercury.

The hydrochloride melts at 194 to 195° C. with decomposition.

Example 40

A solution of 5 g. of 2,3,4,4a,5,6-hexahydro-1H-pyrazino-[1,2-a]quinoline, 4 g. of acrylonitrile and 0.1 ml. of glacial acetic acid in 100 ml. of absolute toluene is boiled under reflux for 20 hours. The batch is evaporated in vacuo, the residue taken up in ether and washed with saturated sodium carbonate solution and with water. Distillation of the ether residue in a high vacuum yields 3-(2-cyanoethyl)-2,3,4,4a,5,6-hexahydro-1H-pyrazino[1,2 - a]quinoline of the formula

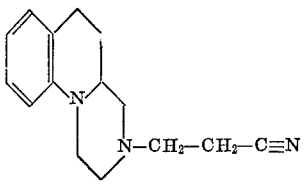

in the form of a faintly yellow oil boiling at 185 to 187° C. under 0.15 mm. pressure of mercury.

The hydrochloride melts at 227 to 229° C. with decomposition.

Example 41

A solution of 30 g. of 2,3,4,4a,5,6-hexahydro-1H-pyrazino[1,2-a]quinoline, 13.5 g. of chloracetonitrile and 18 g. of triethylamine in 300 ml. of ethanol is allowed to stand at room temperature for 48 hours. The batch is evaporated in vacuo, the residue taken up in methylene chloride and washed with water. The methylene chloride solution dried over sodium sulphate is filtered off and evaporated. The solid ether residue is recrystallized from a mixture of ether and petroleum ether to yield 3-(cyanomethyl)-2,3,4,4a,5,6-hexahydro-1H-pyrazino[1,2-a]quinoline of the formula

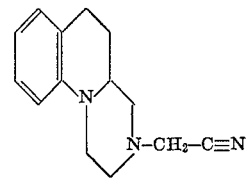

in the form of colourless crystals melting at 75 to 77° C.

The hydrochloride melts at 200 to 203° C. with decomposition.

Example 42

A solution of 5 g. of 2,3,4,4a,5,6-hexahydro-1H-pyrazino[1,2-a]quinoline, 4 g. of acrylamide and 0.1 ml. of glacial acetic acid in 100 ml. of absolute toluene is boiled for 20 hours under reflux. The reaction mixture is taken up in 200 ml. of methylene chloride, extracted with saturated sodium carbonate solution and with water, dried over sodium sulphate and evaporated in vacuo. The solid residue is recrystallized from a mixture of ethanol and petroleum ether to yield 3-(2-carbamoyl-ethyl)-2,3,4,4a,5,6-hexahydro-1H-pyrazino[1,2-a]quinoline of the formula

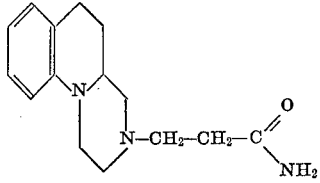

in the form of colourless crystals melting at 139 to 140° C.

The hydrochloride melts at 185 to 190° C. with decomposition.

Example 43

Tablets containing 50 mg. of 3-(2-carbethoxyethyl)-2,3,4,4a,5,6-hexahydro-1H-pyrazino[1,2 - a]quinoline hydrochloride may be prepared, for example, with the following ingredients:

| Per tablet: | Mg. |
|---|---|
| 3-(2-carbethoxyethyl)-2,3,4,4a,5,6 - hexahydro-1H-pyrazino[1,2 - a]quinoline hydrocloride | 50 |
| Wheat starch | 40 |
| Lactose | 70 |
| Colloidal silicic acid | 10 |
| Arrowroot | 19 |
| Talc | 10 |
| Magnesium stearate | 1 |
| | 200 |

Method.—The 3 - (2 - carbethoxyethyl)-2,3,4,4a,5,6-hexahydro-1H-pyrazino[1,2-a]quinoline hydrochloride is mixed with part of the wheat starch, with lactose and collodidal silicic acid, and the mixture passed through a sieve. The remaining wheat starch is pasted with five times the quantity of water on a water bath and the powdery mixture kneaded with this paste until a slightly plastic mass is formed. The plastic mass is pressed through a sieve having a mesh of about 3 mm., dried and the dry granulate once more passed through a sieve. The arrowroot, talc and magnesium stearate are then added and the mixture compressed to form tablets weighing 200 mg.

In an analogous manner tablets may be prepared which contain the hydrochlorides described in the preceding examples, particularly 3-(2-carbamoylethyl)-2,3,4,4a,5,6-hexahydro-1H-pyrazino[1,2-a]quinoline hydrochloride,
3-(3-oxobutyl)-2,3,4,4a,5,6-hexahydro-1H-pyrazino-[1,2-a]quinoline hydrochloride,
8-methyl-2,3,4,4a,5,6-hexahydro-1H-pyrazino[1,2-a]quinoline hydrochloride,
8-methoxy-2,3,4,4a,5,6-hexahydro-1H-pyrazino[1,2-a]quinoline hydrochloride,
8-chloro-2,3,4,4a,5,6-hexahydro-1H-pyrazino[1,2-a]quinoline hydrochloride,
3-(3-oxobutyl)-8-methoxy-2,3,4,4a,5,6-hexahydro-1H-pyrazino[1,2-a]quinoline hydrochloride,
3-(3-oxobutyl)-8-methyl-2,3,4,4a,5,6-hexahydro-1H-pyrazino[1,2-a]quinoline hydrochloride,
3-(3-hydroxybutyl)2,3,4,4a,5,6-hexahydro-1H-pyrazino-[1,2-a]quinoline hydrochloride,
3-(3-acetoxybutyl)-2,3,4,4a,5,6-hexahydro-1H-pyrazino-[1,2-a]quinoline hydrochloride or
3-(3-butyryloxybutyl)-2,3,4,4a,5,6-hexahydro-1H-pyrazino[1,2-a]quinoline hydrochloride.

Example 44

Tablets, containing 50 mg. of 2,3,4,4a,5,6-hexahydro-1H-pyrazino[1,2-a]quinoline hydrochloride, can be prepared, for example, from the following ingredients:

| Content per tablet: | Mg. |
|---|---|
| 2,3,4,4a,5,6 - hexahydro - 1H - pyrazino[1,2-a]quinoline hydrochloride | 50 |
| Wheat starch | 40 |
| Lactose | 70 |
| Colloidal silica | 10 |
| Arrowroot | 19 |
| Talcum | 10 |
| Magnesium stearate | 1 |
| | 200 |

Preparation.—The 2,3,4,4a,5,6-hexahydro-1H-pyrazino-[1,2-a]quinoline hydrochloride is mixed with part of the wheat starch, with lactose and colloidal silica and the mixture is passed through a sieve. The remaining wheat starch is pasted on a water bath with 5 times its weight of water, and the powder mixture is kneaded with this paste until the whole has turned into a slightly plastic mass which is then pressed through a sieve of about 3 mm. mesh, dried, and the dry granulate is once more sieved. Then arrowroot, talcum and magnesium stearate are mixed in and the whole is made into tablets weighing 200 mg.

Example 45

In a similar manner as hereinbefore described there may be prepared 3-methallyl-4-methyl-8-allyloxy-2,3,4,4a,5,6-hexahydro-1H-pyrazino[1,2-a]quinoline hydrochloride,
3-(3-butynyl)-1-methyl-10-acetylamino-2,3,4,4a,5,6-hexahydro-1H-pyrazino[1,2-a]-quinoline hydrochloride
3-(5-methyl-cyclohex-2-en-1-yl-methyl)-2,3,4,4a,5,6-hexahydro-1H-pyrazino[1,2-a]quinoline hydrochloride,
3-(2-norbornen-6-yl)-2,3,4,4a,5,6-hexahydro-1H-pyrazino[1,2-a]quinoline hydrochloride,
3-(2-cyclohexylvinyl)-2,3,4,4a,5,6-hexahydro-1H-pyrazino[1,2-a]quinoline hydrochloride,
3-(3-cyclohexyl-propargyl)-2,3,4,4a,5,6-hexahydro-1H-pyrazino[1,2-a]quinoline hydrochloride,
3-(3-carboxypropargyl)-2,3,4,4a,5,6-hexahydro-1H-pyrazino[1,2-a]quinoline hydrochloride,
3-(2-morpholinocarbonyl-ethyl)-2,3,4,4a,5,6-hexahydro-1H-pyrazino[1,2-a]quinoline hydrochloride,
3-[4-(diethylaminocarbonyl)-but-2-enyl]-2,3,4,4a,5,6-hexahydro-1H-pyrazino[1,2-a]-quinoline hydrochloride,
3-[4-(para-methylbenzyloxycarbonyl)-butyl]-2,3,4,4a,5,6-hexahydro-1H-pyrazino[1,2-a]quinoline hydrochloride,
3-[3-(meta-nitrobenzyloxycarbonyloxy)-propyl]-2,3,4,4a,5,6-hexahydro-1H-pyrazino[1,2-a]quinoline hydrochloride,
3-[2-(ortho-acetoxyphenethyloxycarbonyl)-ethyl]2,3,4,4a,5,6-hexahydro-1H-pyrazino[1,2-a]quinoline hydrochloride,
3-(para-allyloxycinnamy)-9-carbethoxyamino-2,3,4,4a,5,6-hexahydro-1H-pyrazino[1,2-a]quinoline hydrochloride,
3-[4-(meta-trifluoromethylphenyl)-but-2-ynyl]-2,3,4,4a,5,6-hexahydro-1H-pyrazino[1,2-a]quinoline hydrochloride,
3-(ortho-acetoxybenzyl)-5,7-dimethyl-2,3,4,4a,5,6-hexahydro-1H-pyrazino[1,2-a]quinoline hydrochloride,
3-(3,4-methylenedioxybenzyl)-6-methyl-9-nitro-2,3,4,4a,5,6-hexahydro-1H-pyrazino[1,2-a]quinoline hydrochloride,
3-(meta-phenylacetoxyphenethyl)-8-benzoyloxy-2,3,4,4a,5,6-hexahydro-1H-pyrazino[1,2-a]quinoline hydrochloride,
3-(3,4,5-tri-ethoxycarbonyloxy-phenethyl)-9-amino-2,3,4,4a,5,6-hexahydro-1H-pyrazino[1,2-a]quinoline hydrochloride,
3-(meta-nitrobenzyl)-8-(ethoxycarbonyloxy)-2,3,4,4a,5,6-hexahydro-1H-pyrazino[1,2-a]quinoline hydrochloride,
3-(meta-aminobenzyl)-2-methyl-8-phenylacetoxy-2,3,4,4a,5,6-hexahydro-1H-pyrazino[1,2-a]quinoline hydrochloride,
3-(para-benzoylaminobenzyl)-8,9-methylenedioxy-2,3,4,4a,5,6-hexahydro-1H-pyrazino[1,2-a]quinoline hydrochloride,
3-(ortho-carbethoxyaminophenethyl)-8-trifluoromethyl-2,3,4,4a,5,6-hexahydro-1H-pyrazino[1,2-a]quinoline hydrochloride,
3-(2,3,4,5,6-pentachlorobenzyl)-7,8,9-trimethoxy-2,3,4,4a,5,6-hexahydro-1H-pyrazino[1,2-a]quinoline hydrochloride,
3-(bicyclo[2.2.2]oct-2-en-6-ylmethyl)-2,3,4,4a,5,6-hexahydro-1H-pyrazino[1,2-a]quinoline hydrochloride,
3-[2-(5-amino-1-pyrazolyl)-ethyl]-2,3,4,4a,5,6-hexahydro-1H-pyrazino[1,2-a]quinoline hydrochloride,
3-(1-methyl-2-pyrrolylmethyl)-2,3,4,4a,5,6-hexahydro-1H-pyrazino[1,2-a]quinoline hydrochloride,
3-[3-(2-imidazolyl)-propyl]-2,3,4,4a,5,6-hexahydro-1H-pyrazino[1,2-a]quinoline hydrochloride,
3-[2-(para-bromophenyl)-4-oxazolylmethyl]-2,3,4,4a,5,6-hexahydro-1H-pyrazino[1,2-a]quinoline hydrochloride,
3-(2-ethoxyethyl)-2,3,4,4a,5,6-hexahydro-1H-pyrazino-[1,2-a]quinoline hydrochloride,
3-[2-(meta-iodobenzyloxy)-propyl]-2,3,4,4a,5,6-hexahydro-1H-pyrazino[1,2-a]quinoline hydrochloride,
3-[3-(parabenzoylaminobenzyloxy)-butyl]-2,3,4,4a,5,6-hexahydro-1H-pyrazino[1,2-a]quinoline hydrochloride,
3-[5-(para-chlorophenyl)-4-meta-trifluoromethylphenethyloxy)-pentyl]-2,3,4,4a,5,6-hexahydro-1H-pyrazino[1,2-a]quinoline hydrochloride, 3-[4-(meta-nitrophenyl)-3-(para-hydroxybenzoyloxy)-
butyl]-2,3,4,4a,5,6-hexahydro-1H-pyrazino[1,2-a]
quinoline hydrochloride,
3-[2-(β-(para-nitrophenyl)-propionyloxy)-ethyl]-
2,3,4,4a,5,6-hexahydro-1H-pyrazino[1,2-a]
quinoline hydrochloride,
3-[2-(α-(para-aminophenyl)-propionyloxy)-ethyl]-
2,3,4,4a,5,6-hexahydro-1H-pyrazino[1,2-a]
quinoline hydrochloride,
3-[2-cyclobutyl-2-(meta-fluorobenzyloxy)-propyl]-
2,3,4,4a,5,6-hexahydro-1H-pyrazino[1,2-a]
quinoline hydrochloride,
3-[4-(para-acetoxyphenyl)-3-oxobutyl]-7-methyl-8,9-
dimethoxy-2,3,4,4a,5,6-hexahydro-1H-pyrazino-
[1,2-a]quinoline hydrochloride,
3-[-(cyclohept-2-enyl)-2-oxopropyl]-2,3,4,4a,5,6-hexa-
hydro-1H-pyrazino[1,2-a]quinoline hydrochloride,
3-[3-(para-nitrophenyl)-3-oxobutyl]-2,3,4,4a,5,6-hexa-
hydro-1H-pyrazino[1,2-a]quinoline hydrochloride,
3-[4-(bicyclo[2.2.2]oct-1-yl)-3-hydroxy-3-methyl-
butyl]-2,3,4,4a,5,6-hexahydro-1H-pyrazino[1,2-a]
quinoline hydrochloride, and
3-cyclobutyl-10-benzoylamino-2,3,4,4a,5,6-hexahydro-
1H-pyrazino[1,2-a]quinoline hydrochloride.

We claim:
1. A member selected from the group consisting of compounds of the formula

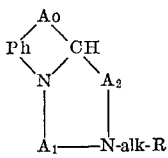

in which R stands for a member selected from the group consisting of carboxy, carbo-lower alkoxy, cyano, carbamoyl, lower alkyl-carbamoyl, di-lower alkyl-carbamoyl, phenyl and phenyl substituted in the phenyl radical by at least one member selected from the group consisting of lower alkyl, lower alkoxy, hydroxyl, halogen, nitro and trifluoromethyl, thienyl, pyridyl, furyl, thiazolyl, oxazolyl, lower alkyl-thienyl, lower alkyl-pyridyl, lower alkyl-furyl, lower alkyl-thiazolyl, phenyl-thiazoyl and phenyl-oxazolyl, alk stands for lower alkylene and Ph stands for a member selected from the group consisting of ortho-phenylene, lower alkyl - ortho - phenylene, lower alkoxy-ortho-phenylene, halogeno-ortho-phenylene, trifluoromethyl-ortho-phenylene and hydroxy-ortho-phenylene, $A_0$ and $A_1$ each stands for a member selected from the group consisting of 1,2-ethylene and lower alkylated 1,2-ethylene and $A_2$ for a member selected from the group consisting of methylene and lower alkylated methylene, and their therapeutically acceptable acid addition salts.

2. A product as claimed in claim 1, in which alk-R stands for a member selected from the group consisting of phenyl-lower alkyl and phenyl-lower alkyl substituted in the phenyl radical by at least one member selected from the group consisting of lower alkyl, lower alkoxy, hydroxyl, halogen, nitro and trifluoromethyl and Ph stands for a member selected from the group consisting of ortho-phenylene, lower alkyl-ortho-phenylene, lower alkoxy-ortho-phenylene, halogeno-ortho-phenylene, trifluoromethyl-ortho-phenylene and hydroxy-ortho-phenylene.

3. A product as claimed in claim 1, in which alk-R stands for a member selected from the group consisting of benzyl, lower alkylated benzyl, lower alkoxylated benzyl and halogenated benzyl, Ph stands for a member selected from the group consisting of ortho-phenylene, lower alkyl-ortho-phenylene, lower alkoxy-ortho-phenylene, halogeno-ortho-phenylene and hydroxy-ortho-phenylene, $A_0$ and $A_1$ each stands for 1,2-ethylene and $A_2$ for methylene.

4. A product as claimed in claim 1, which product is the 3 - benzyl-2,3,4,4a,5,6-hexahydro-1H-pyrazino[1,2-a] quinoline or a therapeutically acceptable acid addition salt thereof.

5. A product as claimed in claim 1, which product is the 3-(para-methoxybenzyl) - 2,3,4,4a,5,6-hexahydro-1H-pyrazino[1,2-a]quinoline or a therapeutically acceptable acid addition salt thereof.

6. A product as claimed in claim 1, which product is the 3-(para-chlorobenzyl) - 2,3,4,4a,5,6 - hexahydro-1H-pyrazino[1,2-a]quinoline or a therapeutically acceptable acid addition salt thereof.

7. A product as claimed in claim 1, which product is the 3 - benzyl - 8 - methyl - 2,3,4,4a,5,6 - hexahydro-1H-pyrazino[1,2-a]quinoline or a therapeutically acceptable acid addition salt thereof.

8. A product as claimed in claim 1, which product is the 3-benzyl-8-methoxy-2,3,4,4a,5,6 - hexahydro-1H-pyrazino[1,2-a]quinoline or a therapeutically acceptable acid addition salt thereof.

9. A product as claimed in claim 1, which product is the 3-(β-phenylethyl) - 2,3,4,4a,5,6 - hexahydro-1H-pyrazino[1,2-a]quinoline or a therapeutically acceptable acid addition salt thereof.

10. A product as claimed in claim 1, which product is the 3-(γ-phenylpropyl) - 2,3,4,4a,5,6-hexahydro-1H-pyrazino[1,2-a]quinoline or a therapeutically acceptable acid addition salt thereof.

11. A product as claimed in claim 1, which product is the 3-(3,4,5 - trimethoxybenzyl) - 2,3,4,4a,5,6-hexahydro-1H-pyrazino[1,2-a]quinoline or a therapeutically acceptable acid addition salt thereof.

12. A product as claimed in claim 1, which product is the 3-benzyl - 8 - chloro - 2,3,4,4a,5,6 - hexahydro-1H-pyrazino[1,2-a]quinoline or a therapeutically acceptable acid addition salt thereof.

13. A product as claimed in claim 1, which product is the 3-benzyl - 8 - fluoro - 2,3,4,4a,5,6-hexahydro-1H-pyrazino[1,2-a]quinoline or an acid addition salt thereof.

14. A product as claimed in claim 1, in which alk-R stands for a member selected from the group consisting of 2-thienylmethyl, pyridylmethyl, 2-furylmethyl, 2-thiazolymethyl, 2-oxazolylmethyl, 2-phenyl-4-thiazolylmethyl and 2-phenyl-4-oxazolylmethyl, Ph stands for a member selected from the group consisting of ortho-phenylene, lower alkyl-ortho-phenylene, lower alkoxy-ortho-phenylene, halogeno-ortho-phenylene and hydroxy-ortho-phenylene, $A_0$ and $A_1$ each stands for 1,2-ethylene and $A_2$ for methylene.

15. A product as claimed in claim 1, which product is the 3 - furfuryl - 2,3,4,4a,5,6 - hexahydro-1H-pyrazino[1,2-a]quinoline or a therapeutically acceptable acid addition salt thereof.

16. A product as claimed in claim 1, which product is the 3-(2-thienyl) - 2,3,4,4a,5,6 - hexahydro - 1H - pyrazino[1,2-a]quinoline or a therapeutically acceptable acid addition salt thereof.

17. A product as claimed in claim 1, which product is the 3 - [2-(2-pyridyl) - ethyl] - 2,3,4,4a,5,6 - hexahydro-1H-pyrazino[1,2-a]quinoline or a therapeutically acceptable acid addition salt thereof.

18. A product as claimed in claim 1, which product is the 3 - (2-carbethoxyethyl) - 2,3,4,4a,5,6-hexahydro-1H-pyrazino[1,2-a]quinoline or a therapeutically acceptable acid addition salt thereof.

19. A product as claimed in claim 1, which product is the 3 - (2-carbamoylethyl) - 2,3,4,4a,5,6 - hexahydro-1H-pyrazino[1,2-a]quinoline or a therapeutically acceptable acid addition salt thereof.

20. A member selected from the group consisting of compounds of the formula

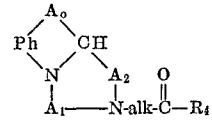

in which alk stands for lower alkylene and $R_4$ stands for a member selected from the group consisting of lower alkyl, phenyl, lower alkylated phenyl, lower alkoxylated phenyl, halogenated phenyl and trifluoromethylated phenyl and Ph stands for a member selected from the group consisting of ortho-phenylene, lower alkyl-ortho-phenylene, lower alkoxy-ortho-phenylene, halogeno-ortho-phenylene, trifluoromethyl-ortho-phenylene and hydroxy-ortho-phenylene, $A_0$ and $A_1$ each stands for a member selected from the group consisting of 1,2-ethylene and lower alkylated 1,2-ethylene and $A_2$ for a member selected from the group consisting of methylene and lower alkylated methylene, and their therapeutically acceptable acid addition salts.

21. A product as claimed in claim 20, wherein alk stands for lower alkylene separating the carbonyl carbon atom from the ring nitrogen atom by two carbon atoms and $R_4$ for a member selected from the group consisting of lower alkyl, phenyl, lower alkylated phenyl, lower alkoxylated phenyl, halogenated phenyl and trifluoromethylated phenyl, Ph stands for a member selected from the group consisting of ortho-phenylene, lower alkyl-ortho-phenylene, lower alkoxy-ortho-phenylene, halogeno-ortho-phenylene and hydroxy-ortho-phenylene, $A_0$ and $A_1$ each stands for 1,2-ethylene and $A_2$ for methylene.

22. A product as claimed in claim 20, which product is the 3 - (3-oxobutyl) - 2,3,4,4a,5,6 - hexahydro - 1H-pyrazino[1,2-a]quinoline or a therapeutically acceptable acid addition salt thereof.

23. A product as claimed in claim 20, which product is the 3-(3-oxobutyl) - 8 - methyl - 2,3,4,4a,5,6 - hexahydro-1H-pyrazino[1,2-a]quinoline or a therapeutically acceptable acid addition salt thereof.

24. A product as claimed in claim 20, which product is the 3-(3-oxobutyl) - 8 - methoxy - 2,3,4,4a,5,6-hexahydro-1H-pyrazino[1,2-a]quinoline or a therapeutically acceptable acid addition salt thereof.

25. A member selected from the group consisting of compounds of the formula

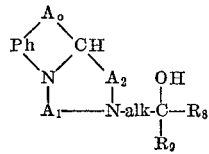

in which $R_8$ stands for a member selected from the group consisting of hydrogen, lower alkyl, phenyl, lower alkylated phenyl, lower alkoxylated phenyl, halogenated phenyl and trifluoromethylated phenyl, $R_9$ stands for a member selected from the group consisting of hydrogen and lower alkyl, alk for lower alkylene and Ph stands for a member selected from the group consisting of ortho-phenylene, lower alkyl-ortho-phenylene, lower alkoxy-ortho-phenylene, halogeno-ortho-phenylene, trifluoromethyl-ortho-phenylene and hydroxy-ortho-phenylene, $A_0$ and $A_1$ each stands for a member selected from the group consisting of 1,2-ethylene and lower alkylated 1,2-ethylene and $A_2$ for a member selected from the group consisting of methylene and lower alkylated methylene, and their therapeutically acceptable acid addition salts.

26. A product as claimed in claim 25, in which alk stands for lower alkylene separating the oxygenated carbon atom from the ring nitrogen atom by two carbon atoms, $A_0$ and $A_1$ each stands for 1,2-ethylene and $A_2$ for methylene.

27. A product as claimed in claim 25, which product is the 3-(3-hydroxybutyl) - 2,3,4,4a,5,6 - hexahydro-1H-pyrazino[1,2-a]quinoline or a therapeutically acceptable acid addition salt thereof.

28. A member selected from the group consisting of compounds of the formula

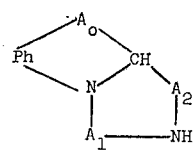

in which Ph stands for ortho-phenylene substituted by at least one member selected from the group consisting of lower alkoxy, lower alkenyloxy, methylenedioxy, halogen, trifluoromethyl, hydroxy, lower alkanoyloxy, benzoyloxy, phenyl-lower alkanoyloxy, lower alkoxycarbonyloxy, nitro, amino, lower alkanoylamino, benzoylamino, phenyl-lower alkanoylamino and lower alkoxycarbonylamino, $A_0$ and $A_1$ each stands for a member selected from the group consisting of 1,2-ethylene and lower alkylated 1,2-ethylene and $A_2$ for a member selected from the group consisting of methylene and lower alkylated methylene, and their therapeutically acceptable acid addition salts.

29. A product as claimed in claim 28, wherein Ph stands for a member selected from the group consisting of lower alkoxy-ortho-phenylene, halogeno-ortho-phenylene and hydroxy-ortho-phenylene, $A_0$ and $A_1$ each stands for 1,2-ethylene and $A_2$ for methylene.

30. A product as claimed in claim 28, which product is the 8-methoxy - 2,3,4,4a,5,6 - hexahydro - 1H - pyrazino[1,2-a]quinoline or a therapeutically acceptable acid addition salt thereof.

31. A product as claimed in claim 28, which product is the 8-hydroxy - 2,3,4,4a,5,6 - hexahydro - 1H - pyrazino[1,2-a]quinoline or a therapeutically acceptable acid addition salt thereof.

References Cited

UNITED STATES PATENTS 3,393,195   7/1968   Thesing et al. _____ 260—268

OTHER REFERENCES

Nagata et al.: CA 59, 12812 b (1959).

NICHOLAS S. RIZZO, Primary Examiner

R. V. RUSH, Assistant Examiner

U.S. Cl. X.R.

424—250

CASE 6025/1-3/6115/6116

PO-1050
(5/69)

UNITED STATES PATENT OFFICE
CERTIFICATE OF CORRECTION

Patent No. 3,647,791      Dated March 7, 1972

Inventor(s) ALBERTO ROSSI ET AL

It is certified that error appears in the above-identified patent and that said Letters Patent are hereby corrected as shown below:

Column 34, line 36, after "or" delete "an" and insert --- a therapeutically acceptable ---.

Signed and sealed this 29th day of August 1972.

(SEAL)
Attest:

EDWARD M. FLETCHER, JR.
Attesting Officer

ROBERT GOTTSCHALK
Commissioner of Patents